(12) United States Patent
Kawai et al.

(10) Patent No.: US 6,577,334 B1
(45) Date of Patent: Jun. 10, 2003

(54) VEHICLE CONTROL

(75) Inventors: Masao Kawai, Aichi-pref. (JP); Keiichi Kimura, Aichi-pref. (JP); Hideki Aruga, Aichi-pref. (JP)

(73) Assignees: KabushikiKaisha Equos Research (JP); Aisin AW Co., Ltd. (JP)

( * ) Notice: Subject to any disclaimer, the term of this patent is extended or adjusted under 35 U.S.C. 154(b) by 0 days.

(21) Appl. No.: 09/250,709

(22) Filed: Feb. 16, 1999

(30) Foreign Application Priority Data

Feb. 18, 1998 (JP) .............................. 10-054533
Aug. 1, 1998 (JP) ........................... 10-230255

(51) Int. Cl.⁷ ................................ H04N 7/18
(52) U.S. Cl. ..................................... 348/148
(58) Field of Search ................. 348/148, 118, 348/119; 701/23, 28, 41, 82, 93, 24, 117, 44, 211; H04N 7/18

(56) References Cited

U.S. PATENT DOCUMENTS

| | | | |
|---|---|---|---|
| 5,245,422 A | * 9/1993 | Borcherts et al. ........... 348/119 |
| 5,483,453 A | * 1/1996 | Uemura et al. .......... 364/424.02 |
| 5,485,378 A | * 1/1996 | Franke et al. ........... 364/424.05 |
| 5,999,877 A | * 12/1999 | Takahashi et al. ........... 701/117 |
| 6,035,253 A | * 5/2000 | Hayashi et al. .............. 701/211 |

\* cited by examiner

*Primary Examiner*—Nhon Diep
(74) *Attorney, Agent, or Firm*—Lorusso, Loud & Kelly

(57) ABSTRACT

A vehicle control system includes a road data memory, current position sensor that detects a current position of a vehicle and a camera that takes a picture of the road ahead of the current position. At least one indicator line such as a lane dividing line on the road is shown in the picture. The picture changes as the vehicle moves forward along the road, during which increase in width of the indicator line or increase of distance between two indicator lines may be detected. By such detection, the vehicle position with respect to the indicator line is determined, the result of which is incorporated into control operation of an automatic transmission, for example.

21 Claims, 25 Drawing Sheets

Fig. 20

| NAVI | | DECELERATION DEMAND Gn | | | | | | | |
|---|---|---|---|---|---|---|---|---|---|
| | | G0 | G1 | G2 | G3 | G4 | G5 | G6 | G7 |
| A/T | CVT | i0.5 | i0.8 | i1.0 | i1.2 | i1.5 | i1.5 | i1.5 | i2.0 |
| | 5-SPEED | 5 | 4 | 3 | 3 | 2 | 2 | 2 | 1 |
| | 4-SPEED | 4 | 4 | 3 | 3 | 2 | 2 | 2 | 1 |

ABS ECU: LARGER ↑ ↓ SMALLER

SUS ECU: HARDER ↑ ↓ SOFTER

4WD ECU: ENGAGE ↑ ↓ RELEASE
- G4: ↑R$_0$ ↓R$_3$
- G5: ↑R$_0$ ↓R$_3$
- G6: ↑R$_0$ ↓R$_3$
- G7: ↑R$_0$ ↓R$_3$

RGB ECU

VEHICLE CONTROL

This application claims, under 35 USC 119, priority of Japanese Application No. 10-230255 filed Aug. 1, 1998 and Japanese Application No. 10-54533 filed Feb. 18, 1998.

BACKGROUND OF THE INVENTION

1. Field of the Invention

The present invention relates in general to vehicle control. More particularly, in accordance with the present invention, indicator lines on a road, such as lane dividing lines, are detected and analyzed to collect information from which a current vehicle position is determined and parameters are developed to be considered in vehicle control.

2. Description of the Prior Art

Recent navigation systems, mounted on a vehicle, induce the driver to drive along a predetermined drive route. Japanese patent publication No. 6-58141 discloses a vehicle control system that controls the transmission or other system on the vehicle in accordance with the road data stored in the navigation system. In the prior art vehicle control, the road data for a vicinity around the current position is read out from a memory in the navigation system. However, when the vehicle enters a junction at which a road branches off from the main road, the prior art is not capable of determining if the vehicle is still on the main road or on the branch road. Such a situation could occur, for example, when the vehicle enters a ramp onto a speedway or an exit branched off from the main road at an interchange. In the prior art, such an occurrence could not be confirmed until the vehicle had moved too far away from a main road which is detected by GPS (global positioning system) or other current position sensor means. The mode or manner of vehicle control, such as automatic transmission control, should preferably differ between travel on the main road and on a branch road. Delay in detection of road change results in failure of appropriate vehicle control to be executed immediately after the vehicle has entered a branch road.

In the prior art, a drive route from a current position to a goal is determined only when the goal is input by the driver. Input must be done every time the goal is changed. This is sometimes troublesome and it is desirable to infer a drive route even if no goal is input by the driver.

When the vehicle is running on a multi-lane road, it has been impossible to determine the lane in which the vehicle is currently traveling. If the lane can be determined, for example if it can be determined that the vehicle is running in a passing lane on the speedway at a position astern of the junction at a predetermined distance, it could be inferred that the vehicle is most likely to go straight. As can be understood from this example, the result of determination of the driving direction at a junction becomes much more reliable by taking the lane position into consideration.

SUMMARY OF THE INVENTION

Accordingly, it is a principal object of the present invention to provide a vehicle control system which incorporates determination of the specific lane in which the vehicle is currently running.

In accordance with an aspect of the present invention, there is provided a vehicle control system comprising memory means storing road data; current position sensor means for detecting a current position of a vehicle; line recognizing means for recognizing indicator lines on a road; drive position determining means for determining the vehicle position with respect to the indicator lines; and control means for control of operation of at least one system mounted in the vehicle in accordance with the road data stored in the memory means and the result obtained by the drive position determining means.

The line recognizing means preferably includes a camera for taking a picture of the road ahead of the vehicle.

In a preferred embodiment, the drive position determining means comprises lane width change detecting means for detecting the distance between two indicator lines in the picture taken by the camera, the two indicator lines being located at opposite sides of a lane in which the vehicle is running, and branch determining means for determining the direction of movement of the vehicle at a branch in the road, in accordance with detection by the lane width change detecting means.

In another preferred embodiment, the drive position determining means comprises line width change detecting means for detecting the width of at least one indicator line in the picture taken by the camera, the indicator line being located at one or both of opposite sides of a lane in which the vehicle is traveling, and branch determining means for determining the direction of movement of the vehicle at a branch in the road in accordance with the result of detection by the line width change detecting means.

In the most preferred embodiment, the drive position determining means comprises lane width change detecting means for detecting the distance between two indicator lines in the picture taken by the camera, the two lines being located at opposite sides of a lane in which the vehicle is running, line width change detecting means for detecting the width of at least one of the two indicator lines, and branch determining means for determining the direction of movement of the vehicle at a branch in the road in accordance with the results of detection by the lane width change detecting means and the line width change detection means.

The drive position determining means may comprise lane continuity detecting means for detecting continuity of at least one indicator line in the picture taken by the camera to determine if the indicator line is solid or broken, the indicator line being located at one or both of opposite sides of a lane on which the vehicle is traveling, and drive lane determining means for determining the current driving lane of the vehicle in accordance with the result of detection by the lane continuity detecting means.

Alternatively, the drive position determining means may comprise line shift detecting means for detecting that an indicator line has gradually moved from one side to the other side in the picture taken by the camera, and lane change determining means for determining that the vehicle has changed lanes when a line shift is detected by the line shift detecting means.

The vehicle control system of the present invention preferably also includes reliability determining means for determining a reliability level with respect to the drive position that has been determined by the drive position determining means. The control means operates in a manner which differs depending upon the reliability level determined by the reliability determining means. In an example, the reliability determining means determines a reliability level in accordance with a plurality of results of determination by the drive position determining means that have been obtained within a predetermined period of time.

In a preferred embodiment, the reliability determining means determines a reliability level in accordance with a first drive position determined by the drive position determining means and a second drive position determined within a predetermined period of time by the drive position determining means.

The control means preferably operates, in a usual manner, depending upon the road data for a first drive route inferred by the current position detected by the current position sensor means, but is made operative in accordance with the road data of a second drive route when the second drive route is determined to be different from the first drive route by the drive position determining means.

The vehicle control system may further comprise decelerating operation sensor means for detecting initiation of a decelerating operation. In this case, the reliability level may be determined by the reliability level determining means in further consideration of detection of some decelerating operation by the decelerating operation sensor means.

The vehicle control system may further comprise decelerating operation sensor means for detecting that some decelerating operation has been initiated, in which case the control means is made operative in response.

The decelerating operation is preferably at least one selected from the group consisting of operation of a foot brake pedal, release of an accelerator pedal, operation of a trafficator and rotation of a steering wheel beyond a predetermined angle.

In a typical embodiment, the control means controls a shift range of speeds or gear ratios in an automatic transmission.

In accordance with another aspect of the present invention, there is provided a method of vehicle control comprising the steps of taking a picture of a road ahead of a current vehicle position, including indicator lines extending on the road; determining a current vehicle position with respect to the indicator lines; obtaining road data of a drive route to be determined by the current vehicle position; and controlling operation of a system mounted on the vehicle in accordance with the road data. Determination of the current vehicle position is carried out by at least one or any combination of results of drive lane determination that determines the current driving lane of the vehicle on a multi-lane road in accordance with detection of solid or broken lane divider line, branch determination that determines if the vehicle has entered a junction on the road in accordance with detection of change of profile of the indicator lines, and lane change determination that determines a lane change of the vehicle at the junction in accordance with detection of lateral movement of the indicator (lane) lines in the picture.

In accordance with still another aspect of the present invention, there is provided a computer readable memory media to be used in combination with a computer mounted on a vehicle. The memory media of the present invention stores a program by which the computer controls operation of the vehicle in accordance with a method comprising the steps of taking a picture of a road ahead of a current vehicle position including indicator lines extending on the road; determining a current vehicle position with respect to the indicator lines; obtaining road data of a drive route to be determined by the current vehicle position; and controlling operation of a system mounted on the vehicle depending upon the road data. Determination of the current vehicle position should be carried out by at least one or any combination of results of drive lane determination that determines a current drive lane of the vehicle on a multi-lane road depending upon detection of the type of the indicator lines, i.e., solid or broken, branch determination that determines if the vehicle enters a junction on the road depending upon detection of change of profile of the indicator lines and lane change determination that determines a lane change of the vehicle at the junction depending upon detection of lateral movement of the indicator lines in the picture.

BRIEF DESCRIPTION OF THE DRAWINGS

Other objects and advantages of the present invention can be understood from the following description when read in conjunction with the accompanying drawings in which:

FIG. 20 is an example of a control map for vehicle control in accordance with the deceleration demand;

DETAILED DESCRIPTION OF THE PREFERRED EMBODIMENTS

The present invention will be hereinbelow described in more detail with reference to the accompanying drawings.

Figure 1:
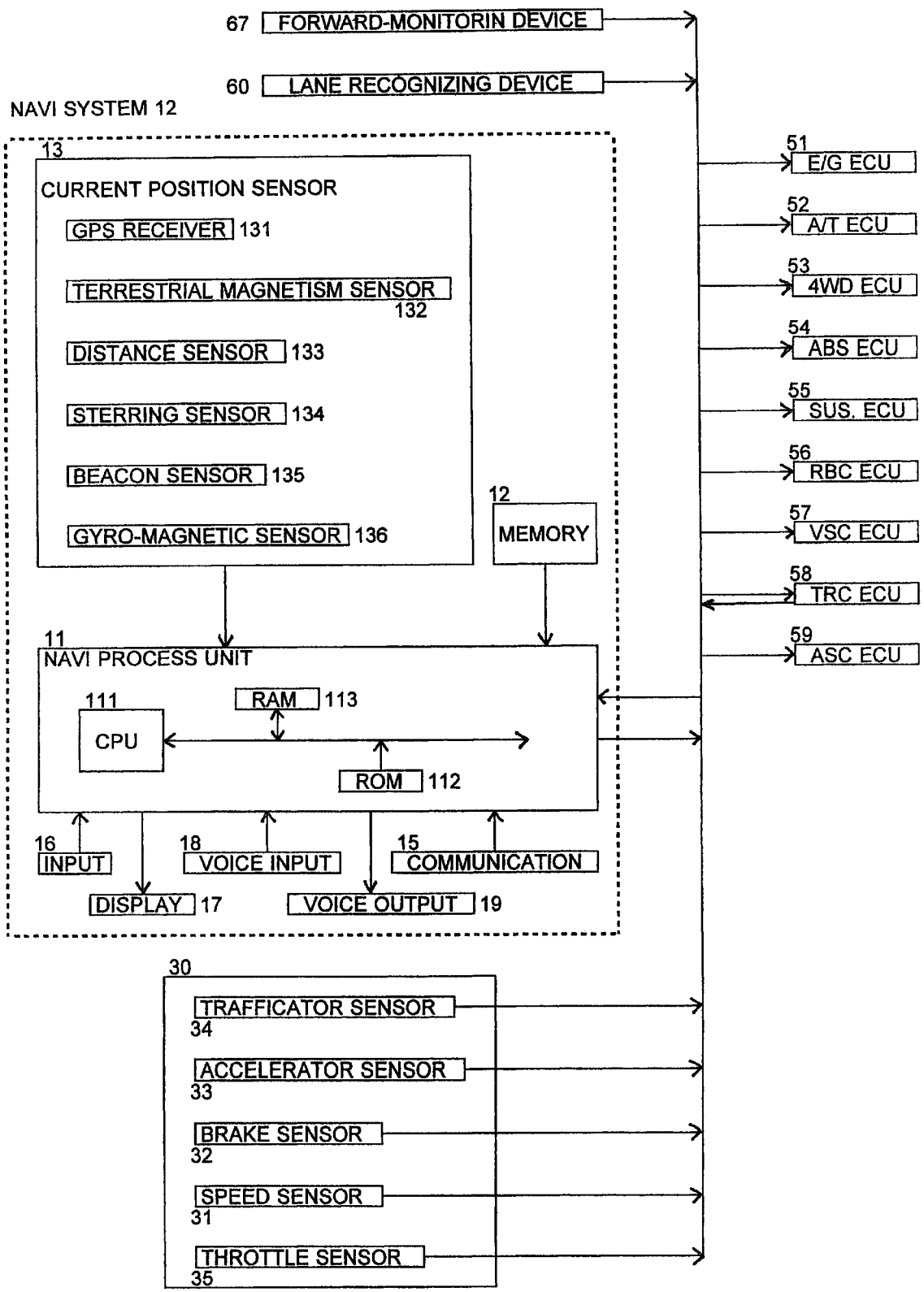
FIG. 1 is a block diagram of a vehicle control system according to a preferred embodiment of the present invention.

FIG. 1 is a block diagram showing a vehicle control device embodying the present invention. The vehicle control device 1 of this embodiment includes a memory 12 for storing road data, a current position detecting section 13, a lane recognizing device 60, a forward-monitoring device 67, a vehicle condition detecting section 30 and control devices 51–59. There is also provided a navigation system 10. Memory 12 and current position detecting section 13 are mounted in navigation system 10. Navigation system 10 also includes a navigation processing unit 11, a communication unit 15, an input unit 16, a display unit 17, a voice input unit 18 and a voice output unit 19.

Navigation processing unit 11 has a central processing unit (CPU) 111 that operates in response to the input information to perform various data processing operations and to output the results of these operations. To CPU 111 are connected ROM 112 and RAM 113 through data bus lines. ROM 112 is a read-only-memory storing programs for searching for a drive route to the goal, drive guidance along the drive route, and determination of certain sections on the drive route, for example. RAM 113 is a random-access-memory to be used as a working memory when CPU 111 performs a data processing operation.

Memory 12 stores map data files, network data files and goal data files. The map data files include topographic map data for wide areas and city or town map data. The network data files include road data and crossing data for use in map matching and route finding. The goal data files include data regarding name, location, address, photograph, etc. of various institutions, installations, establishments, facilities, constructions and buildings.

The road data represents data regarding nature and characteristics of each road between two specific crossings, including the identification number of crossings involved, the number of nodes, absolute position (absolute coordinates given by latitude and longitude) of nodes, length of segments between two nodes, angles between two adjacent segments, road width, road name, etc. The respective node data includes presence of railroad crossing, radius of curvature, slope or gradient, etc. The respective segment data includes the number of lanes, presence of a tunnel, etc. The crossing data includes its identification number, the identification numbers of roads at a street crossing, photographs, etc. Memory 12 may store other data files regarding location of gas stations, guidance to sightseeing spots, etc. These data files are selectively read out to output necessary information through display unit 17 and/or voice output unit 19.

The road data and the crossing data are usually used for route finding in the navigation system. These items of data cooperate with each other to determine road information necessary for route finding, including road width, slope, road surface condition, radius of curvature at a corner, crossing, T-shaped crossing, the number of lanes, points where the number of lanes increases or decreases, points of entrance to a corner, railway crossings, exits of the speedway, tollgates, road-width decreasing point, downhill road, uphill road, entrance branch roads to speedway, etc.

Any memory device such as DVD, MO, CD-ROM, optical disk, magnetic tape, IC card or optical card may be used as the data files. Although CD-ROM or other memory device having a large memory capacity is preferably used to store the files, an IC card may be used for other data files requiring less memory capacity. In another embodiment, data regarding traffic jam information and drive route to the goal, etc. may be received from an information center, not shown, through communication unit 15. The map data files and the network data files may also be acquired through communication. The network data files may be updated through communication or self-updated when recognizing any road for which data is not stored in the current data files.

Figure 2:
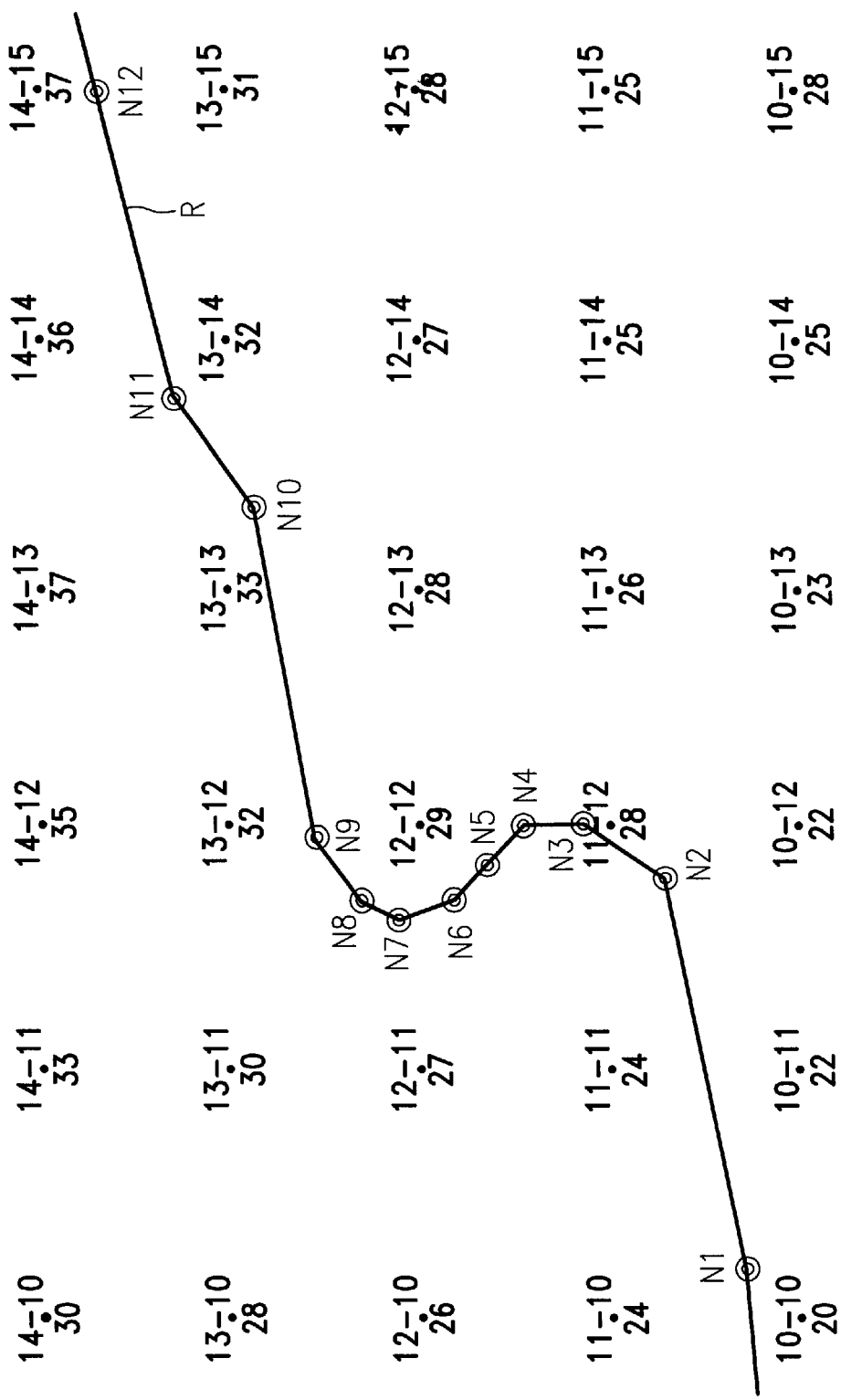
FIGS. 2 and 3 are explanatory diagrams showing examples of roads represented by a series of node points.
Figure 3:
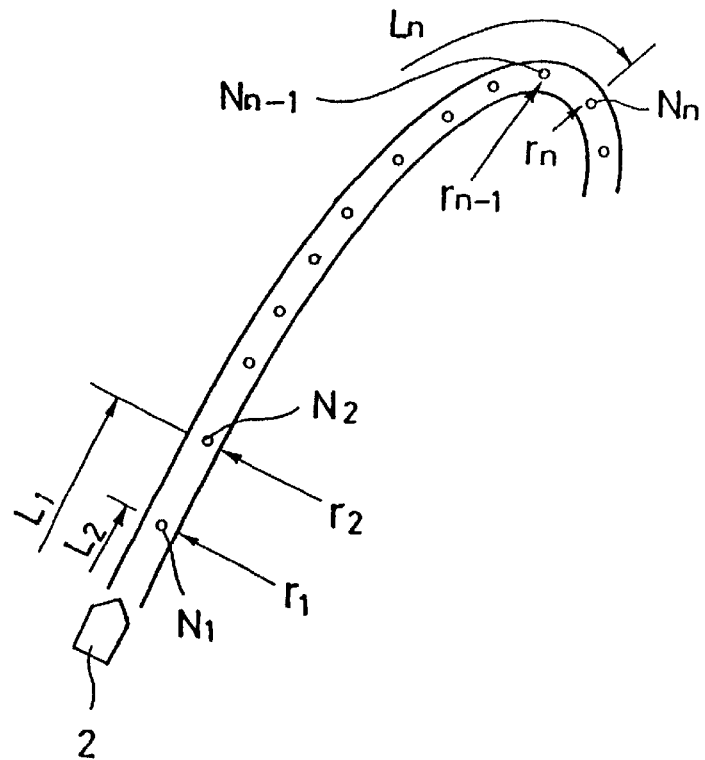

The road shape is determined by nodes and segments, which are stored in memory 12 as the road data. FIG. 2 is a diagram showing an example of the road data stored in memory 12, wherein a solid line R traces the road. The road course is represented by nodes (Ni, N2, ...) and segments connected between two adjacent nodes. Each node is defined at least by its coordinates (which, in this embodiment, are the absolute coordinates given by latitude and longitude).

In this embodiment, the road shape or track is also defined by altitude, as well as by nodes and segments, to provide a three-dimensional definition. Altitude data is given for points arranged at 250-meter spacings from each other in lateral and longitudinal directions. For example, a point of (10—10) is at the altitude of 20 meters and another point of (10–11) is at 22 meters, as shown in FIG. 2.

In this embodiment, the average curvature, the road slope, the altitude variation, the radius of curvature, etc. are determined by relationship between the node positions and the altitude data surrounding the respective nodes. Although the altitude data is given for spaced points as stated above to minimize the data volume, it may be possible that the respective nodes have altitude data. It is also possible that each road section or segment has its own slope data, which is used in combination with others to determine the altitude of a specific node point.

Current position sensor 13 has a GPS receiver 131, a terrestrial magnetism sensor 132, a distance sensor 133, a steering sensor 134, a beacon sensor 135 and a gyro-magnetic sensor 136. GPS receiver 131 receives radio signals from earth satellites to determine the vehicle position. Terrestrial magnetism sensor 132 detects terrestrial magnetism to determine the direction in which the vehicle is advancing. Distance sensor 133 may be a measuring device of a type wherein the number of wheel rotations is detected, followed by calculation or another type wherein acceleration is detected followed by integration twice. Steering sensor 134 is typically an optical rotation sensor or a rotation-resistant volume mounted to a rotating member of a steering element, but may be a steering angle sensor mounted to the wheel. Beacon sensor 135 receives positional information from beacons arranged along the roads. Gyro-magnetic sensor 136 may be a gas-rate or vibration type gyro-magnetic sensor that detects a turning angle velocity of the vehicle followed by integration to determine the vehicle running direction. A lateral acceleration during passage around corners applied to the vehicle may be detected by using gyro-magnetic sensor 136.

GPS receiver 131 and beacon sensor 135 can act independently to measure the vehicle position. Further, the absolute position of the vehicle may be determined by combination of a distance detected by distance sensor 133 and a direction detected by terrestrial magnetism sensor 132 and/or gyromagnetic sensor 136, or by combination of a distance detected by distance sensor 133 and a steering angle detected by steering sensor 134.

Communication unit 15 transmits and receives data to and from FM transmission units and telephone circuits. For example, it receives data regarding road information including traffic jams and traffic accident information that is supplied from a traffic information center.

Input unit 16 is used to input any data for, for example, correction of the current position at the beginning of driving and for input of the destination. An example of input unit 16 is a touch panel arranged on a display unit 17 and adapted to input any information by a touch of a key or menu represented thereon. Another example of input unit 16 is a keyboard, a mouse, a bar code reader, a write pen or a remote controllable input device.

Display unit 17 is used to represent, for example, guidance to operation, operation menu, operation keys, a recommended drive route to the destination determined responsive to a user's request, and a guide map along the drive route. As display unit 17 may be used a CRT display, a liquid crystal display, a plasma display or a hologram device that projects a hologram onto a front glass.

Voice input unit 18 comprises a microphone, for example, through which necessary information can be input by voice. Voice output unit 19 has a voice synthesizing device and a speaker, thereby outputting the synthesized voice guide information. In addition to the synthesized voice guide information, various items of guide information that have been recorded on a tape may also been output through the speaker. The voice guide information may be a combination of the synthesized voice and a recorded voice.

With the above-described arrangement, the navigation system operates to provide road information around the vehicle current position to the driver, thereby guiding the driver along a specific route to the destination. More particularly, when the destination is input through input device 16, navigation processing unit 11 operates to selectively find a recommended drive route to the destination, based on the vehicle current position detected by current position sensor 13 and the road information read out from memory 12. The drive route is output to display unit 17. The drive route shown on display unit 17 cooperates with the voice information output through voice output unit 19 to guide the driver to the destination. When the destination is not input, navigation processing unit 11 outputs only the road information around the vehicle current position to display unit 17. However, in this invention, the system may be modified such that there is provided no function of guiding the driver to the goal along the determined drive route, in which case display unit 17 and voice output unit 19 may be omitted.

With the above-described navigation system 10, current position sensor 13 comprises the current position sensor means, and memory 12 and navigation processing unit 11 cooperate with each other to constitute the road information obtaining means. A specific point positioned forward of the vehicle current position in the drive direction is determined by navigation processing unit 11, based on the current position and the drive direction of the vehicle, both detected by current position sensor 13, and the road information obtained by the road information obtaining means. The distance calculating means, constituted by current position sensor 13, memory 12 and navigation processing unit 11, calculates distance L1–Ln between the current position and the respective nodes N1–Nn.

Memory 12 and navigation processing unit 11 cooperate with each other to constitute node radius calculating means for calculating the node radii r1–rn at the respective node points N1–Nn. As has been described hereinbefore with reference to FIG. 2, the shape or curvature of a specific road in a digital map is defined by a set of nodes indicating points on the road and a set of segments between two adjacent nodes on the road. In this embodiment, a "specific point" is a node. The radius of curvature at the specific point or node may be determined by an angle between two segments connected at said specific point.

Figure 4:
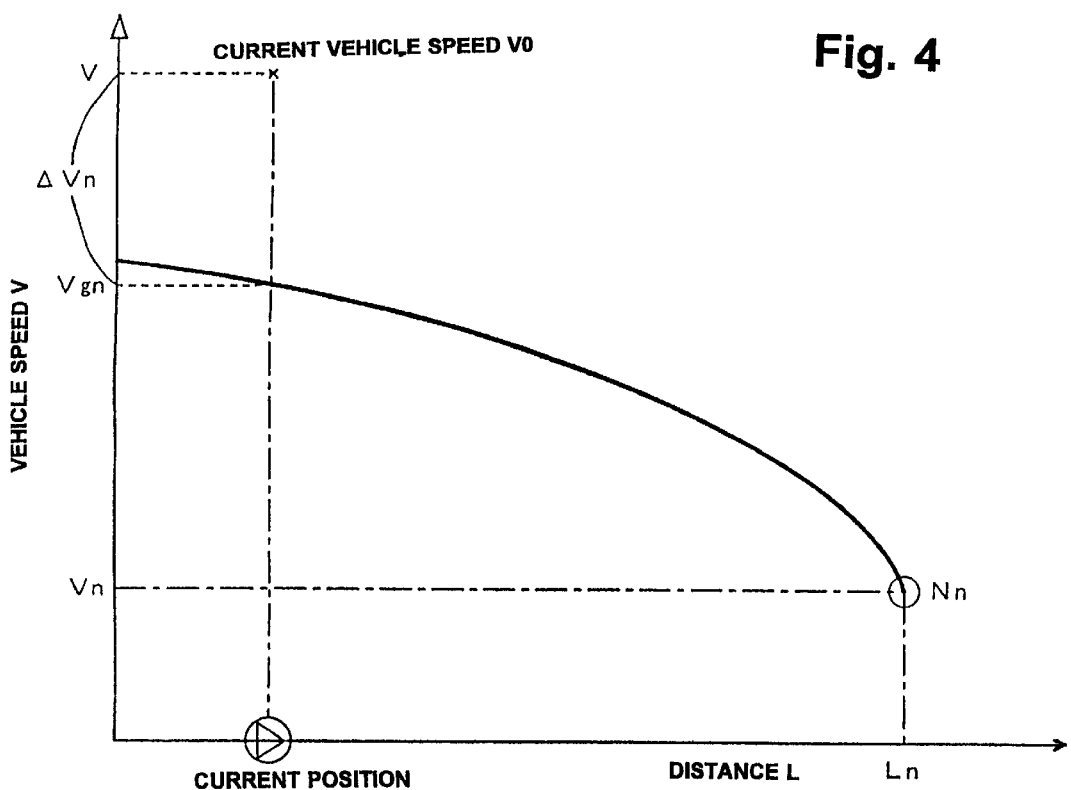
FIG. 4 is a map for use in determination of recommended vehicle speeds at the respective nodes.

Memory 12, current position sensor 13 and navigation processing unit 11 cooperate with one another to constitute a recommended speed calculating means that calculates recommended vehicle speeds V1–Vn at which the vehicle can run through the respective nodes with safety and stability, (which are hereinlater often referred to as "node speeds") based on the respective radii r1–rn and a predetermined lateral acceleration during passage around corners, with reference to a predetermined data table, an example of which is shown in FIG. 4.

FIG. 4 shows an example of a deceleration curve from an appropriate vehicle speed Vgn at the current position to a recommended node speed Nn at the node Nn, which has been determined for a distance Ln from the current position to the node Nn during which an appropriate and smooth transmission gear change (down shift) is carried out. Where the current vehicle speed V0 at the current position exceeds the appropriate vehicle speed Vgn, there is a difference $_A Vn = V - Vgn$. Although one deceleration curve is shown in FIG. 4, a specific deceleration curve is prepared for every node N1–Nn located ahead of the current position along the drive route, so that each node Nn has its peculiar speed Vgn at the current position and also its peculiar overspeed difference $_A Vn$. The maximum difference $_A Vn$ indicates that the vehicle must be decelerated to the greatest extent until it reaches the node. Navigation processing unit 11 calculates "deceleration demand" Gn by dividing the maximum difference $_A Vn$ by the current speed V. In this embodiment, there are prepared eight grades of deceleration demand G0–G7 (G0 is the minimum and G7 is the maximum), wherein the one having a value most equivalent to the calculated deceleration demand Gn is adopted as an output to the respective control devices 51–59 for control to be described later.

Figure 5:
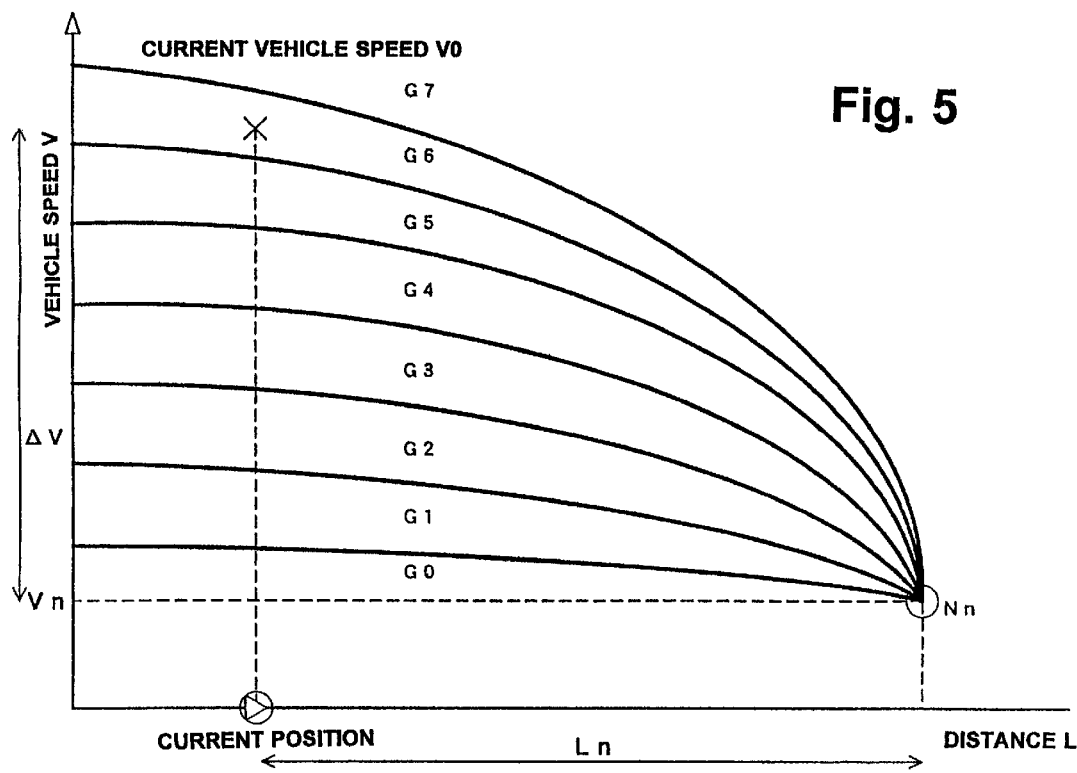
FIG. 5 is a map for use in determination of deceleration demands at the respective nodes.

The deceleration demand Gn may be determined in a more direct manner, by reference to the map shown in FIG. 5 showing eight graded deceleration curves G0–G7. In this example, the current vehicle speed V0 is determined to be closest to a deceleration curve G6 and it is inferred that G6 is the deceleration demand for the node Nn. In like manner, each deceleration demand is determined for every node and the highest one is adapted as an output to the respective control devices 51–59 for control operation to be described later.

In the control operation to be described, a specific drive route to the goal designated by the driver, for example, has been determined by navigation system 10. If no specific drive route has been determined, it can be presumed that the vehicle is to go straight on. When lane recognizing device 60 or forward-monitoring device 67 infers a specific direction in which the vehicle is to go ahead, a drive route extending in that direction is selected.

Lane recognizing device 60 detects opposite edges of each line (usually white or yellow line) which define partition lanes on the road. It also determines if the line is continuous or broken, and if there is a branch in the road.

More specifically, lane recognizing device includes a camera for taking a picture of the line and edge recognizing means for recognizing opposing edges of the line in the picture taken by the camera. It also includes means for determining the position of the vehicle with respect to the recognized line.

Figure 6:
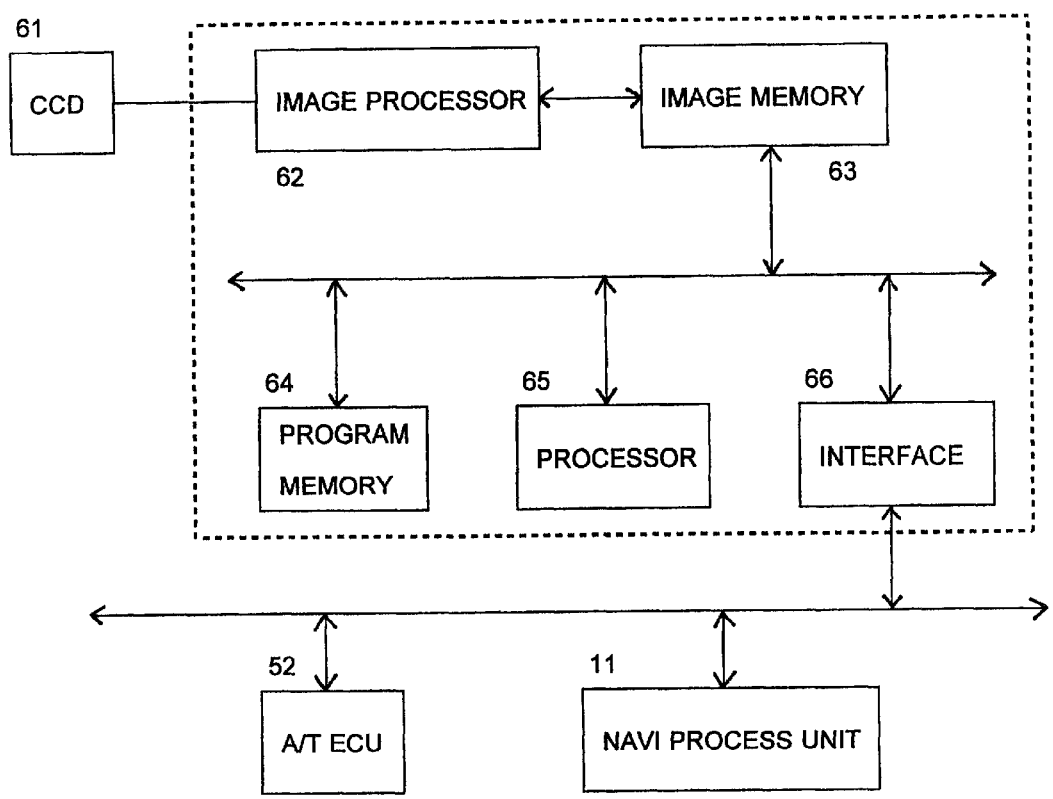
FIG. 6 is a block diagram of a lane recognizing device.

FIG. 6 is a block diagram of lane recognizing device 60. In this embodiment, the camera comprises a CCD (charge coupled device) 61. The edge recognizing means comprises an image processor 62 and an image memory 63. The vehicle position determining means comprises a program memory 64 and a line recognizing processor 65. The signal from processor 65 is supplied, through an interface circuit 66, to an outside navigation processing unit 11 or control devices 51–59, though only one control device, that is an automatic transmission control device 52, is shown in FIG. 6.

Image processor 62 processes the original picture taken by CCD camera 61 to emphasize the edges of the line, which are stored in image memory 63 and then supplied to image memory line processor 65. The vehicle position determining means determines if the line is continuous or broken or if the line is gradually narrowed. When such is determined, it means that the road is branched. It also determines that there is a lane change when the line moves to the left or right in the moving pictures. Thus, the vehicle position means a specific one of the branch roads or a specific one of lanes on the road on which the vehicle is running. Program memory 64 is typically in the form of a ROM storing various programs to be read out for line recognition by processor 65.

Forward-monitoring device 67 includes a camera, which may be the same as that used in lane recognizing device 60, for taking a picture forward of the vehicle, an image processor and a directional radar sensor (laser radar, millimeter wave radar, etc.). The image processor detects white lines on the road, guardrails, railroad crossings, stop signs, other vehicles ahead, etc. to determine a point where the vehicle is to begin deceleration. It also determines a distance to the vehicle ahead or a radius of curvature on the road ahead. A laser radar detects light reflected from a guardrail to determine a distance thereto. A millimeter wave radar is effective to detect a post of the guardrail.

Other means capable of detecting a signal from a road information source such as sign post and magnetic nail may be used. In one embodiment, the forward-monitoring device includes means for detecting tollgates, crossings, points where the number of lanes decreases or increases, current status (green, yellow or red) of signals, etc. The term "drive information" used in this specification and claims includes the outside information obtained by forward-monitoring device 67 or communication unit 15, the road data stored in memory 12 and the current position information obtained by lane recognizing device 60.

Control devices in this embodiment include engine control device (E/G ECU) 51, automatic transmission control device (A/T ECU) 52, four-wheel-drive control device (4WD ECU) 53, brake control device (ABS ECU) 54, suspension control device (SUS ECU) 55, regenerative brake control device (RBC ECU) 56, vehicle stability control device (VSC ECU) 57, traction control device (TRC ECU) 58 and automatic speed control (ASC ECU) device 59.

E/G ECU 51 operates in response to a signal indicating the current throttle opening, engine revolution, coolant temperature, various sensor signals, etc., to control the engine output. When the deceleration demand Gn is supplied from navigation processing unit 11, it responsively controls the throttle opening or ignition timing to thereby reduce the engine output. Such control may be started in response to detection of some decelerating operation by the driver.

A/T ECU 52 controls the automatic transmission to have a specific transmission stage. The automatic transmission includes a gear train composed in main of planetary gears and a hydraulic circuit for engagement and disengagement between components of the gear train to provide one of multiple transmission stages. The automatic transmission outputs a drive signal to an actuator (hydraulic solenoid) in the hydraulic circuit, so that the actuator operates to control the transmission stage. When the automatic transmission is a stageless transmission, it controls the gear ratio.

The operation of A/T ECU 52 is governed by control programs stored in ROM 112. For example, the transmission stage is determined, in response to the throttle opening degree detected by throttle opening sensor 33 and the vehicle speed detected by vehicle speed sensor 31, by reference to memory tables (transmission maps). The transmission maps selectively determine a specific one of the transmission stages.

The transmission maps have been prepared individually for a normal mode and a power mode, one of which is automatically selected in response to the transmission mode indicating signal supplied from navigation processing unit 11. The transmission mode may also be changed manually by the driver's operation of an AT mode select switch (not shown).

The normal mode stores an economic drive pattern having a good balance of fuel consumption and power, which is suitably applicable for normal driving conditions. Power is given priority in the power mode which is suitably applicable for driving a mountainous area and hill-climbing, for example. In the power mode, a transmission stage having a larger gear ratio tends to be selected, as compared to the transmission control in the normal mode.

A/T ECU 52 acts as a gear ratio control means which operates, in response to the deceleration demand supplied by navigation processing unit 11, to determine a gear ratio range to which the transmission is shiftable. For example, when the current transmission stage has a gear ratio greater than the shiftable range, A/T ECU 52 executes down-shift control.

4WD ECU 53 includes a center differential gear mounted between front and rear drive axes. The center differential gear is controlled by a hydraulic or electromagnetic clutch to appropriately distribute the drive power to the front and rear axles in view of the drive conditions. When navigation processing unit 11 supplies the deceleration demand Gn, 4WD ECU 53 operates as a clutch control means for controlling clutch engagement, in response to detection of some decelerating operation.

A brake control device shown as ABS ECU 54 controls the brake fluid pressure to control the braking power of the vehicle. For example, in case of an emergency braking (i.e., when the speed of brake pedal depression is greater than a predetermined normal speed), the brake fluid pressure is increased to provide greater braking power even with the same amount of depression of the brake pedal. Brake control device 54 shown as ABS ECU in FIG. 1, which also acts as an anti-braking control device, controls the brake fluid pressure to provide intermittent braking operation when a wheel lock is detected during the braking operation. Brake control device 54 also operates in response to the deceleration demand by navigation processing unit 11 to determine an appropriate set value for the brake fluid pressure.

SUS ECU 55 controls front and rear suspension mechanisms individually, in response to the suspension control mode selected by the driver. It may execute automatic control depending upon the vehicle conditions such as vehicle speed, steering angle, engine revolution, brake signal, acceleration or deceleration, etc. For example, it receives signals from a stop lamp (not shown) switch and vehicle speed sensor 31 to calculate the deceleration at the braking condition, from which the suspension is controlled to prevent nose-diving and to provide better comfort for passengers. SUS ECU 55 also executes the suspension control in response to a deceleration demand by navigation processing unit 11, after some deceleration operation is detected.

Regenerative brake control device shown as RBC ECU 56 is mounted in an electric vehicle (EV) driven by an electric motor and controls the regenerative brake power. A so-called hybrid vehicle that is driven selectively by an electric motor and an internal combustion engine may be regarded as a type of EV. The brake unit employed in an EV may be a wheel brake that applies the brake power to the wheel and/or a regenerative brake that applies the brake power to the electric motor. RBC ECU 56 controls the regenerative brake power in response to the deceleration demand from navigation processing unit 11, after some deceleration operation is detected.

A vehicle stability control device shown as VSC ECU 57 includes a gyromagnetic sensor or other type of sensor to detect the lateral acceleration of the vehicle during driving around a corner. Depending upon the detected lateral acceleration, it controls rotation of the respective wheels by adjusting the brake fluid pressure and engine throttle opening to improve stability of the vehicle.

A traction control device, exemplified by TRC ECU 58, detects slippage of tires to control the engine throttle opening and brake fluid pressure, thereby controlling the drive power of the wheels.

The automatic speed control device, exemplified by ASC ECU 59, detects the current vehicle speed. When the current vehicle speed is not identical to a selected speed, it controls the engine throttle opening, transmission stage or gear ratio, ABS, etc., to accelerate or decelerate the vehicle so that the vehicle speed becomes equal to the selected speed.

Navigation processing unit 11, control devices 51–59, lane recognizing device 60 and forward-monitoring device 67 are in communication with each other. Accordingly, the current vehicle position and the road information obtained by navigation processing unit 11, the branch information obtained by lane-recognizing device 60, the road ahead information obtained by forward-monitoring device 67, etc., may be used in another unit or device which is connected thereto by communication lines.

A vehicle condition sensor 30 that detects various vehicle conditions, including the drive conditions, includes vehicle speed sensor means or a vehicle speed sensor 31, decelerating operation sensor means comprising a break sensor 32, an accelerator sensor 33, a blinker sensor 34, and a throttle opening sensor 35. Vehicle speed sensor 31 detects a vehicle speed V. Break sensor 32 detects if the brake pedal is engaged (ON/OFF). Accelerator sensor 33 detects the accelerator's degree of opening α. Trafficator sensor 34 detects ON/OFF of a trafficator switch. Throttle opening sensor 35 detects a degree of throttle opening θ.

When some decelerating operation is detected, at least one of the corresponding brake ON/OFF indicating signal, accelerator degree of opening indicating signal and trafficator ON/OFF indicating signal is supplied to navigation processing unit 11. The vehicle speed V detected by vehicle speed sensor 31 is supplied both to navigation processing unit 11 and transmission control device 52. The throttle opening degree θ detected by throttle opening sensor 35 (or accelerator opening degree detected by accelerator opening sensor 33) is also supplied to the transmission control device 52.

An operation reflecting the driver's intention to decelerate may be detected when the brake signal is ON. The driver's decelerating operation may also be inferred from variation of the accelerator degree of opening. More particularly, when the accelerator opening degree is very small but is still further decreased by more than a predetermined percentage (that is a percentage of a decrease of the amount of depression of the accelerator pedal), it may be determined that the driver intends deceleration. In summary, the driver's operation of rapidly releasing the accelerator pedal may be recognized as an intention to decelerate and, therefore, may be detected as a decelerating operation. Such detection may also be indicated by the amount, speed or acceleration of variation (decrease) of the accelerator opening α. These parameters may be combined with the accelerator opening degree α, after it is changed, to detect the decelerating operation. For example, when the vehicle is running only by inertia the accelerator opening degree α is nearly zero. Accordingly, α≈0 does not always mean an intention to decelerate. Thus, when there is a sufficient decrease of the accelerator opening and when the decreased accelerator opening becomes substantially zero, then it is inferred in the affirmative that there is an intention to decelerate.

In a modified embodiment, the driver's intention to decelerate is inferred only when the amount, speed or acceleration of variation (decrease) of the accelerator opening α becomes greater than a predetermined value.

In still another embodiment, the driver's intention to decelerate is anticipated by an ON signal indicating that the trafficator now in operation. In this embodiment, it is preferred to further take speed into consideration when the trafficator signal is ON. For example, it could be inferred that a decelerating operation is necessary if the vehicle speed still exceeds a predetermined speed at which the vehicle can safely enter a street crossing at the time when the trafficator signal becomes ON. If the vehicle speed has been lowered to below the predetermined speed at the time when the trafficator signal turns ON, it could be inferred that there is no decelerating operation. The driver's intention to decelerate may be inferred in response to an ON signal indicating that the hazard lamp is now in operation, in like manner as above described in connection with the trafficator signal.

In another modification, the driver's intention to decelerate is inferred in the affirmative upon detection of at least one or two of decrease of the accelerator opening, depression of the brake pedal and output of the trafficator. Detection of two of these at the same time should represent a more definite indication of the driver's intention to decelerate.

A lane-change may also be regarded as an indication of the driver's intention to decelerate. The lane-change is detected as a steering angle change detected by steering sensor 134, or by lane recognizing device 60, or by output of a trafficator ON signal, or as a combination of these. A manual down-shift, detected by a shift position sensor mounted in the transmission, may also be regarded as an indication of the driver's intention to decelerate.

The above-described means for detecting or inferring the driver's intention to decelerate may be replaced by means for detecting or inferring initiation of the driver's decelerating operation. For example, release of the accelerator pedal, sudden decrease in depression of the accelerator pedal, depression of the brake pedal, etc., may be regarded as initiation of a decelerating operation.

The automatic transmission in this embodiment has six selectable shift positions, that is, a parking position, a reverse position, a neutral position, a drive position, a third speed position and a second speed position. The shift lever is mechanically connected to the shift position sensor (not shown).

When the shift lever is in the drive position, any one of 1st to 5th gear speeds of the transmission can be selected. One of 1st to 3rd gear speeds is selectable in the third speed position. Either of 1st and 2nd gear speeds is selectable in the second speed position. In this embodiment, navigation system 10 performs the automatic transmission control operation when the shift lever is held in the drive position. For example, when A/T ECU 52 determines 4th gear speed but navigation system 11 commands that the upper limit transmission stage should be 3rd, then the drive signal from A/T ECU 52 ranges 1st to 3rd gear speeds, within which a specific drive signal is supplied to the actuator. The shift position determined by A/T ECU 52 is also supplied to navigation processing unit 11.

As above described, each control device starts execution of control responsive to detection of some decelerating operation or initiation of some decelerating operation by the driver. By way of example, the automatic transmission control starts in response to detection that the accelerator pedal has been depressed so that the transmission is shiftable within a limited range of stages or gear ratios. Accordingly, when the current transmission stage is higher than the limited range, it is shifted down to the highest stage of the limited range.

The manner of transmission control may differ for different transmission ranges. For example, control that determines the upper limit of the shiftable transmission stages to be 3rd is executed when the driver releases the accelerator pedal or steps on the brake pedal, whereas another control that determines the upper limit of the shiftable stages to be 2nd is executed when the driver only steps on the brake pedal.

The manner of control may differ depending upon the result of detection by the forward-monitoring device 67. In one embodiment, even when the 2nd transmission stage has been determined as the upper limit of the shiftable ranges by the road data in memory 12, this can be changed to 3rd or cancelled when the forward-monitoring device does not detect any curve or when the next curve ahead on the drive route is far from the current position. When the vehicle is to go through a crossing, the upper limit may be set to 3rd or 2nd in response to the driver's decelerating operation only when forward-monitoring device 67 finds that the signal at the crossing is red.

When lane recognizing device 60 recognizes a branch or junction on the road, it is possible to anticipate the direction in which the vehicle is to travel. More particularly, it is determined if the vehicle goes straight or turns onto a branch road. Each control device receives the result of this determination and takes it into account in further control operations.

An embodiment of the above control will now be described with reference to the flowchart of FIG. 7. In this embodiment, lane recognizing device 60 includes the lane recognizing means that recognizes a branch or junction and the drive position determining means that determines the driving direction or which road the vehicle is traveling.

Image processor 62 receives an image from CCD camera 61 (at S201) and executes edge emphasizing processing (at S202). The edge emphasizing processing is made by Sobel filtering processing or Laplacian filtering processing to emphasize the edges in the original image. Preferably, a noise eliminating filter is also used in the processing at S202 to improve the accuracy in the lane recognition.

Figure 8:
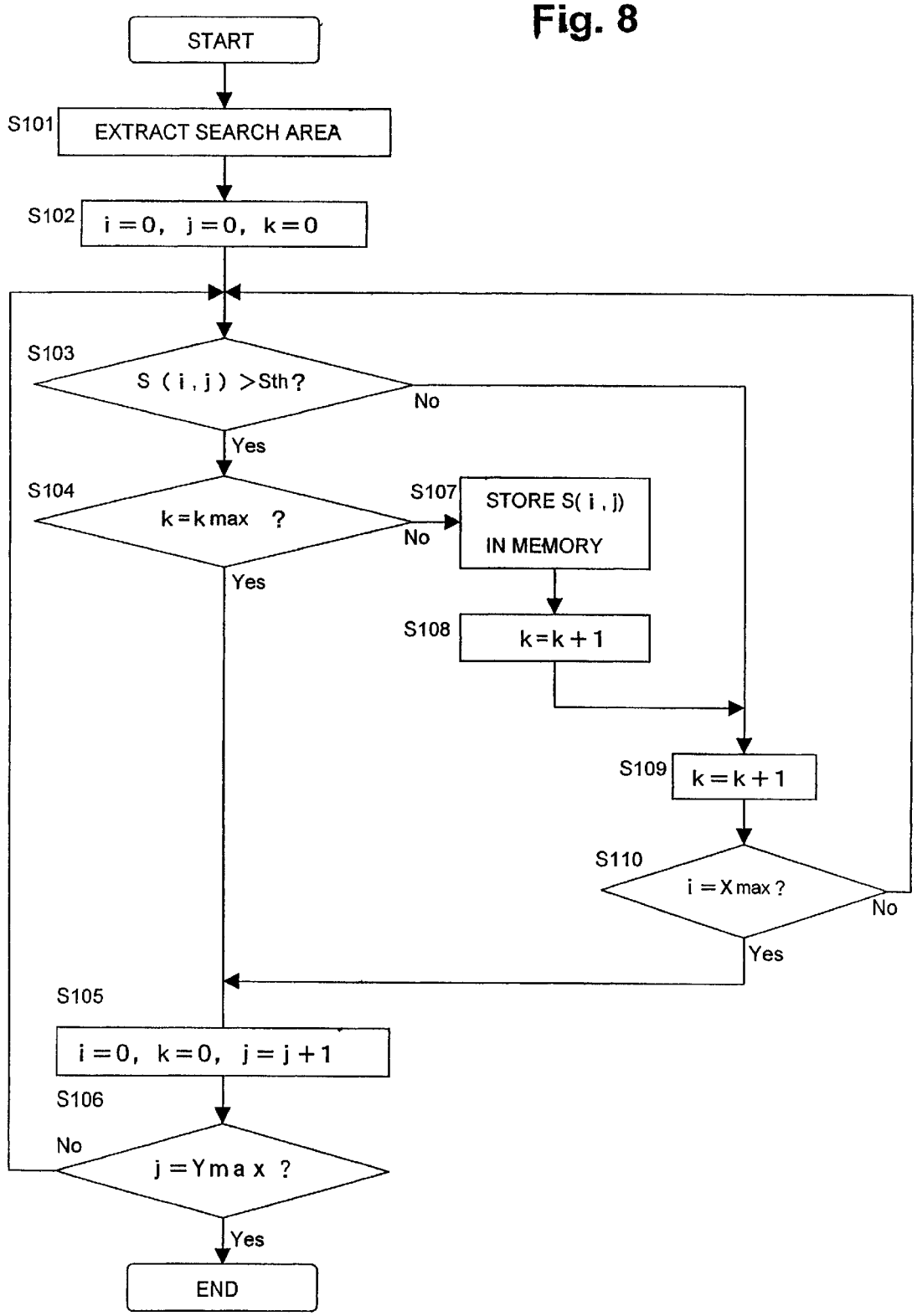
FIG. 8 is a flowchart of the edge line determination subroutine of step S203 of the routine of FIG. 7.
Figure 9:
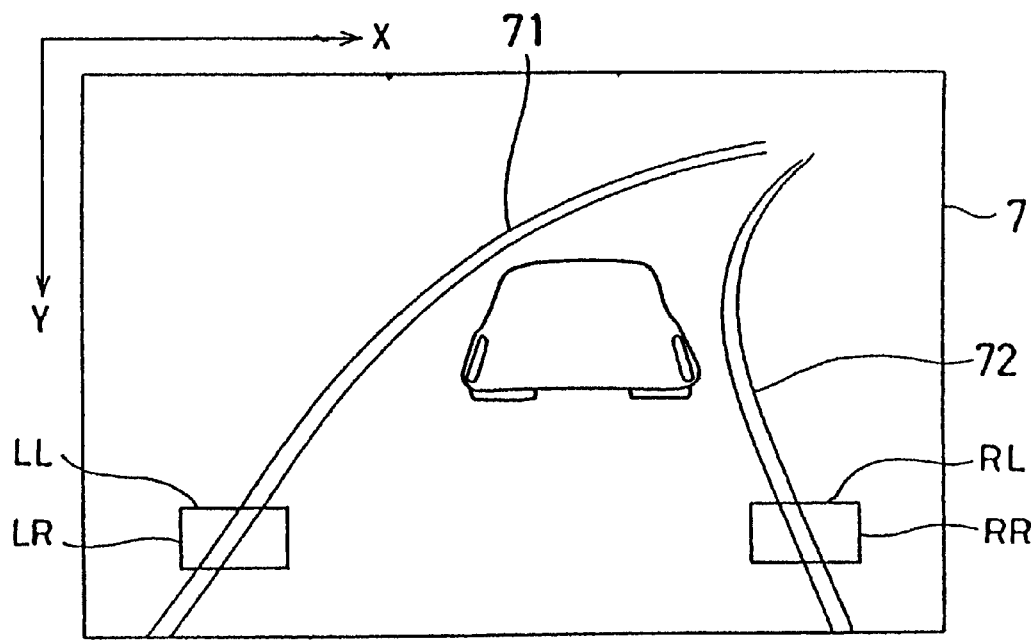
FIG. 9 shows an example of a forward road picture in which search areas are also shown.

Then, the sub-routine shown by the flowchart of FIG. 8 is carried out at S203. The image such as shown in FIG. 9 was supplied to image processor 62 at S201. The image is a photograph taken by CCD camera 61 which represents a forward view on and around the road ahead.

At S101 of the flowchart of FIG. 8, image processor 62 extracts areas including the white lines from the images of FIG. 9. An area including the white lines is hereinbelow referred to as a "search area". When no branch is found ahead on the road, as in the case shown in FIG. 9, there are four search areas LL, LR, RL and RR. LL and LR are search areas to be set for finding the left and right edges, respectively, of the left white line 71. Likewise, RL and RR are search areas to be set for finding the left and right edges, respectively, of the right white line 72. These opposing white lines 71 and 72 define a specific lane along which the vehicle is traveling.

Figure 10:
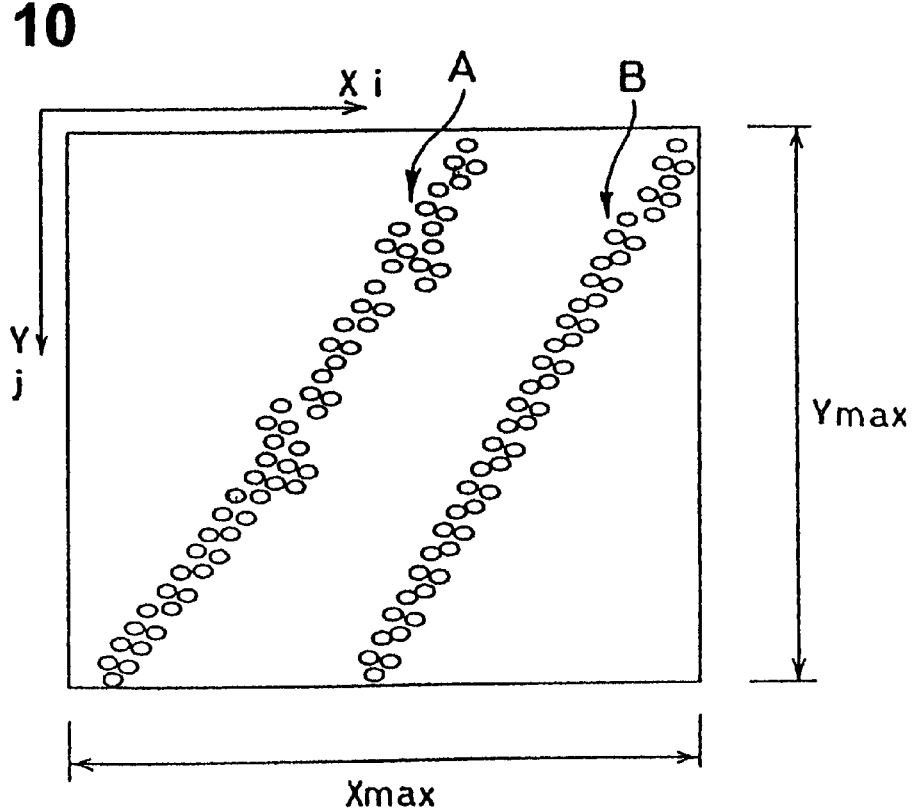
FIG. 10 shows an example of one of the search areas in the picture of FIG. 9.

FIG. 10 shows an example of the search areas. For example, LL extends laterally (along X axis) and vertically (along Y axis) from the origin located at the upper right corner. The extent of the search area is defined by the number of pixels Xmax and Ymax along X and Y axes, respectively. Since the edge emphasizing processing has been carried out at S202 of the flowchart of FIG. 7, the search area shown in FIG. 10 depicts a series of dots A indicating the left edge of the left white line 71 and another series of dots B indicating the right edge thereof.

Again, at S101, the search areas LL, LR, RL and RR are extracted to obtain views such as shown in FIG. 10. Each counter i (longitude along X axis), j (latitude along Y axis) and k (number of dots located on a specific latitude) are initialized to zero, at S102. At S103, it is determined if dot density S(i,j) of a specific point defined by the coordinates (i,j) exceeds a predetermined value Sth. When it is the case (Yes at S103), it is then determined if the number of dots located on the j latitude reached a predetermined number kmax at S104, the coordinates (i,j) are stored in a memory, at S107. Then the value of k is increased by one (at S108) and the value of i is increased by one (at S109). When the determination at S103 reveals that the dot density S(i,j) has not reached a predetermined one Sth (No at S103), the procedure is advanced directly to S109.

At S110, it is determined if the value of i has reached Xmax. If the result is No which means that there remains unsearched longitude, the procedure is returned to S103. When k=kmax (Yes at S104), or when i=Xmax (Yes at 5110) which means that all longitudes from XO to Xmax have been searched, the latitude j to be next searched is increased by one, and the values of i and k are returned to zero, at S105. Such procedure is repeated until the last latitude j=Ymax has been searched (Yes at S106).

In summary, the sub-routine shown by the flowchart of FIG. 8 carries out lateral scanning from the left (defined by the longitude=0) to the right (defined by the longitude j=Xmax), which is repeated from the top (defined by the latitude j=Y0) to the bottom (by the latitude j=Ymax) to search densely dotted areas in the image of FIG. 10. A series of the densely dotted areas thus determined indicates the left edge A of the white line 71. Although the edge searching procedure has been described in connection with the search area LL to find the left edge A of the left white line 71, a similar procedure is applied to the search area RL to find the left edge A of the right white line 72. When the right line edges are to be determined, the flowchart of FIG. 8 is slightly changed so that "i=0" at S102 and S105 should read "i=Xmax−1", "i=i+1' at S109 should read "i=i−1" and "i=Xmax?" at S110 should read "i=−1?", which is applied to the search areas LR and RR so that scanning is effected from the right to the left to find the right edge B of the white line 71, 72. The value of kmax is preferably determined to be 2–4 to prevent errors influenced by noise.

Figure 7:
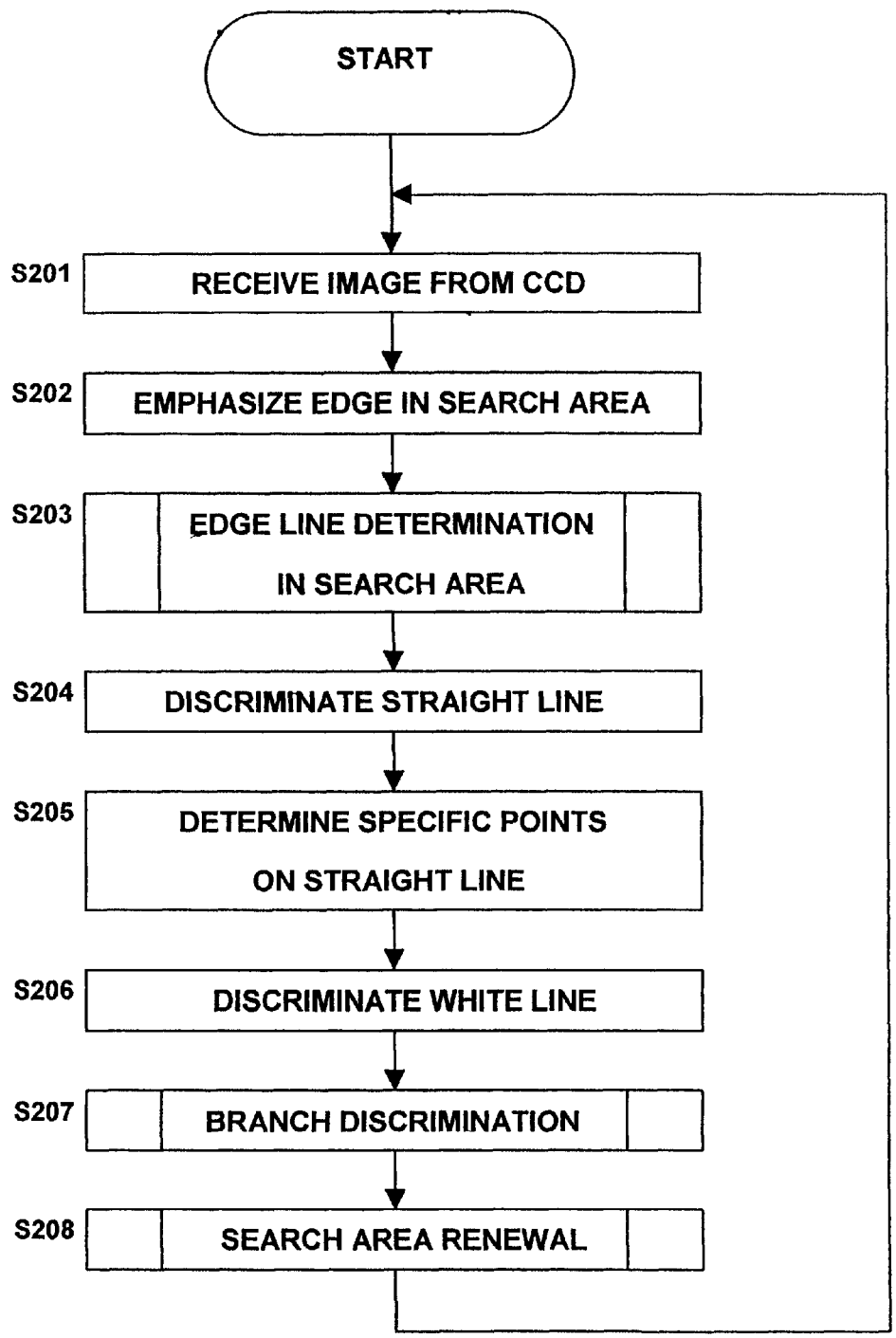
FIG. 7 is a flowchart showing an edge extracting procedure.

After the line edge determining sub-routine has been completed, the procedure is returned to the flowchart of FIG. 7, and it is determined at S204 if the line edge determined by the procedure at S203 may be regarded as a straight extending line. This can be carried out by minimum square approximation or Hough conversion. Determination by minimum square approximation determines that there is no straight extending line when an error correlation coefficient does not reach a predetermined value. Hough conversion determines that there is no straight extending line when the maximum value in Hough space does not reach a predetermined value. When no straight extending line is extracted at S204, the straight extending line which has been estimated in the preceding n-time procedure is adopted. If the preceding n-time procedure also failed to find any straight extending line, no result is obtained at S204. The number of procedure n should preferably correspond a time period of one or several seconds.

Figure 11A:
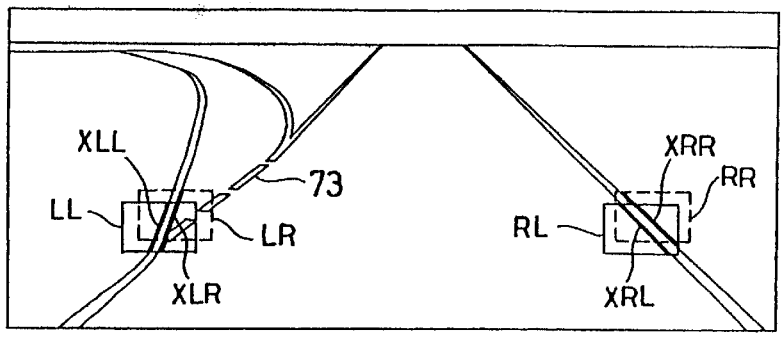
FIGS. 11A–11C show an example of branch determination.
Figure 11B:
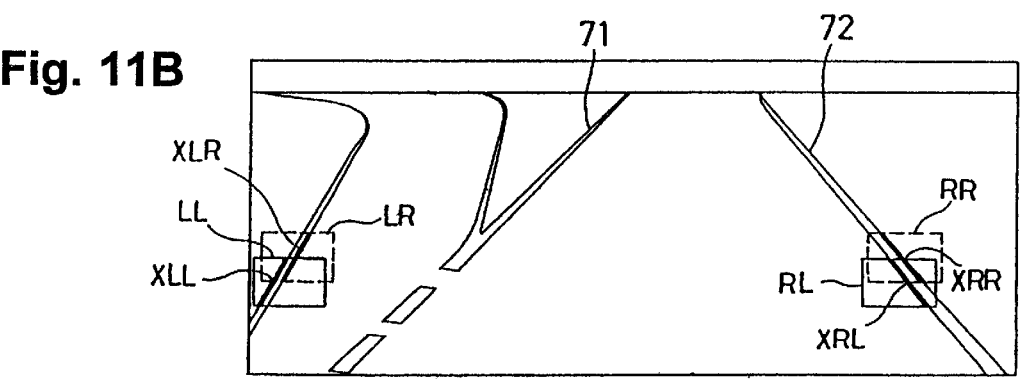
Figure 11C:
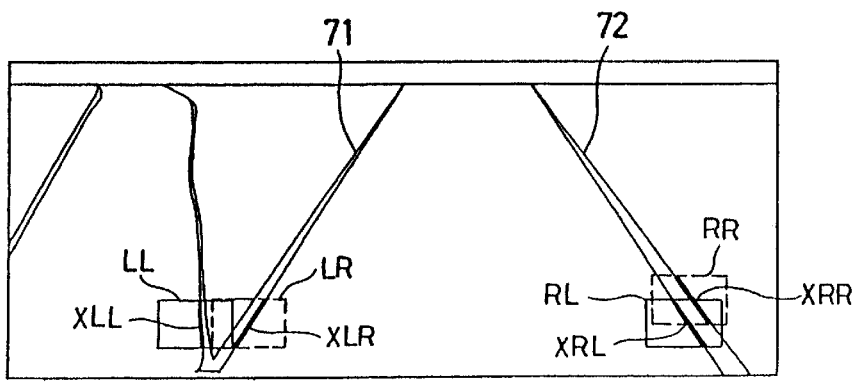

When some straight extending line is extracted at S204, a specific point on the line is determined by its formula at S205. In one embodiment, the specific point has the latitude just in the center of the search area. Thus, the center points on the line edges in the respective search areas LL, LR, RL and RR can be determined as XLL, XLR, XRL and XRR, as shown in FIGS. 11A–11C. In these drawings, the line edges in the respective search areas LL, LR, RL and RR are shown as bold lines.

After the center points indicating the respective line edges have been determined, at S206 it is determined if the straight line estimated at S204 is a white line. More specifically, it is confirmed that XLR representing the right edge of the white line 73 is located in the right of XLL representing the left edge thereof. If this is not the case, these points do not correctly define a white line. The same is applied to the relationship between XRR and XRL at the right white line 72. In such case, even if a specific white line has been found in the preceding procedure, this should be cancelled.

On the assumption that there are opposing white lines 71, 72 which are defined by points XLL, XLR, XRL and XRR, it is then determined if there is a branch at S207. Suppose the left white line 71 has the line width dXL which can be calculated by the distance between the opposite edge points XLR and XLL. Likewise, the right white line 72 has the line width dXR that is the distance between the opposite edge points XRR and XRL. Also calculated is the lane width dX-Lane that is the distance between XRL and XLR. The line width difference ddXR is the a difference between the line width dXR obtained in the current procedure and the last procedure. The lane width difference ddX-Lane is the difference between the lane width dX-Lane obtained in the current procedure and the last procedure.

The branch determination at S207 will now be described in connection with FIGS. 11A–11C which show that the vehicle has not branched off, but remains traveling along the main road defined by the opposing white lines 71 and 72. A branch road branches off to the left from the main road, shown as a white broken line 73 extending in alignment with the left white line 71.

FIG. 10A shows that the search areas LL and LR on the left white line 71 come to a point of junction. If the straight extending line represents the left edge of the left white line 71, which has been extracted by the procedure at S204, is not a broken line but a continuous line, the lane width difference ddX-Lane will increase gradually as the vehicle travels ahead, as can be realized from a comparison between the framed pictures of the forward view shown by FIG. 11A and FIG. 11B. It will be understood that the line left edge disappears in the picture soon after the vehicle proceeds beyond the position shown by FIG. 11B. Accordingly, when a lane width difference ddX-Lane greater than a predetermined value is repeatedly produced in several consecutive determinations, it could be inferred that the vehicle has not branched off and is traveling straight along the main road.

When the picture is changed to FIG. 11C, XLL traces the left edge of the right white line of the branch road whereas XLR traces the right edge of the left white line 71 of the main road, so that the line width difference ddXL is gradually increased to finally exceed a predetermined value. This confirms the previous determination that the vehicle has not branched off and remains traveling straight along the main road.

Figure 12A:
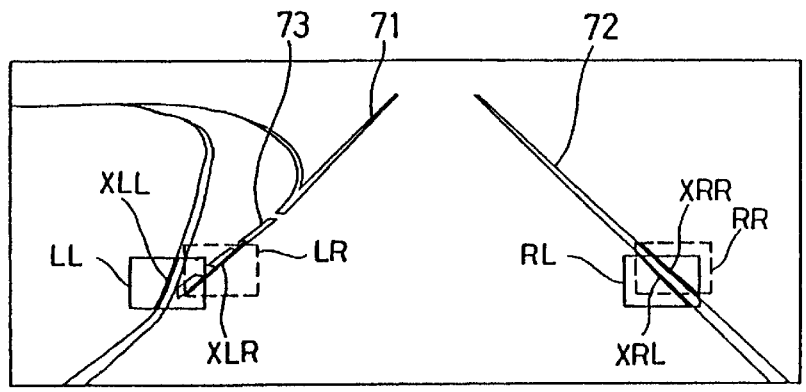
FIGS. 12A–12C shows another example of branch determination.
Figure 12B:
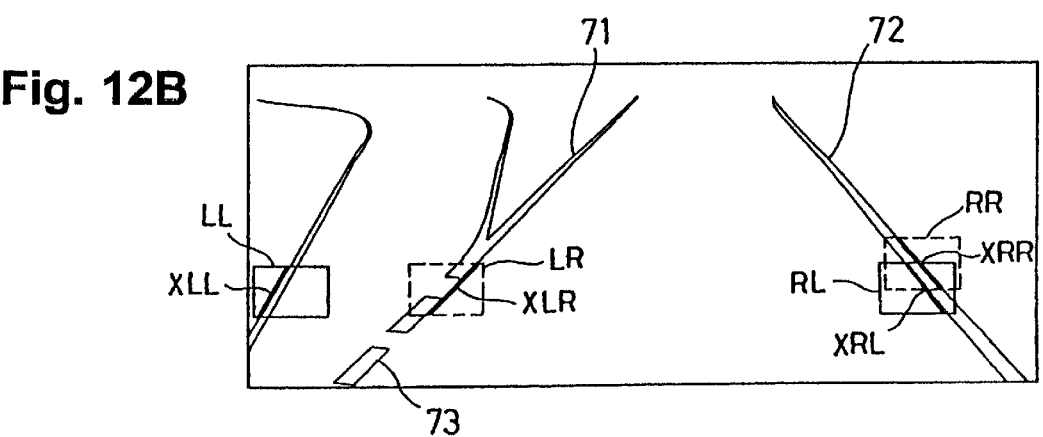
Figure 12C:
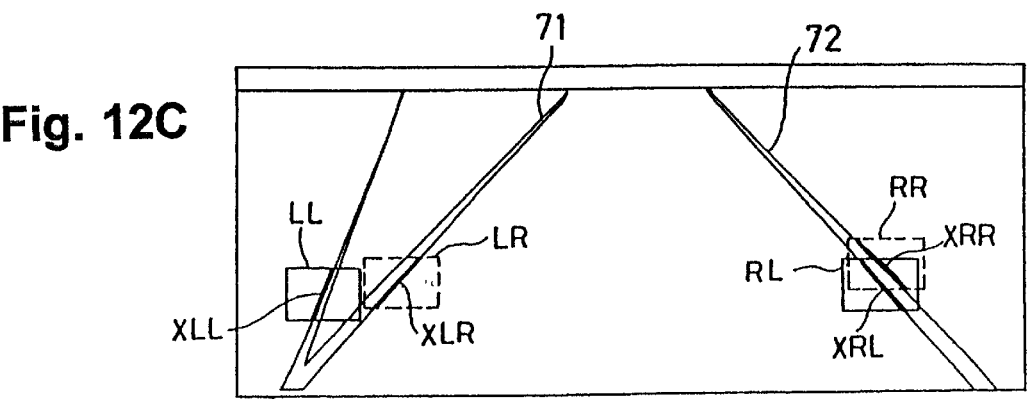

It may be the case that the left edge of the white broken line 73 is found as a result of determination at S204, in which case the pictures will be changed in order as shown in FIGS. 12A–12C. In this case, the left edge point XLL separates gradually from the right edge point XLR, as shown in FIG. 12B, so that a line width difference ddX greater than a predetermined value is repeatedly produced in several consecutive determinations. By this, it could be inferred that the vehicle has not branched off and is traveling straight along the main road. Soon after the picture of FIG. 12B, the left edge point XLL will disappear and another edge point XLL indicating the left edge of the right white line of the branch road is displayed in the picture as shown in FIG. 12C. As has been described in connection with FIG. 11C, XLL tracing the left edge of the right white line of the branch road and XLR tracing the right edge of the left white line 71 of the main road gradually separate from each other, so that the line width difference ddXL is gradually increased to finally exceed a predetermined value, which confirms the previous determination that the vehicle has not branched off and continues to travel straight along the main road.

The foregoing is an exemplary description of the lane determination procedure at S207 with respect to the left white line 71. A similar procedure is applied to the right white line 72, which will be described in more detail with reference to the flowchart of FIG. 13, which is of course applicable with slight changes to the left white line 71. The flowchart of FIG. 13 describes a branch determination procedure in which the road branch or junction is detected in response to a remarkable increase in the width of the white line, an example of which has been described with reference to FIG. 11C and FIGS. 12A–12B, though these are examples pertaining to a branch from the left white line 71.

It is confirmed at S301 that the right-hand branch determination is enabled, and it is confirmed at S302 that a representative point XRR of the right edge of the right white line 72 has been determined at S206. When there is negative confirmation (No at S301 or S302), the procedure is ended.

At S304, the width dXR of the right white line 71 is calculated by dXR=XRR−XRL, and the width difference ddXR=dXR/now−dXR/old is also calculated, where dXR/ now is the width dXR obtained in the current procedure and dXR/old is the width obtained in the last procedure. It is determined at S305 if the width difference ddXR exceeds a predetermined value. This comparison cancels a small width change to prevent error which could result from uneven width of the right white line 72. When the width difference ddXR is greater than a predetermined value (Yes at S305), the value at R-Counter is increased by one at S306. The value at R-Counter indicates the number of detections of width increase of the right white line 72. When the width difference ddXR is smaller than a predetermined value (No at S305), the value at R-Counter is decreased by one, at S309.

At S307, the value at R-Counter which has been increased by one at S306 is compared with a predetermined value. If greater than the predetermined value (Yes at S307), which indicates that the right white line 72 is widened to a predetermined extent, it is determined at S308 that the right white line 72 has a branch road, followed by a procedure to be described with reference to the flowchart of FIG. 15. At S313 this branch determining procedure is nullified, and dXR/old and the value at R-Counter are reset to zero for the next branch determining procedure. The reason why the branch determining procedure is nullified at S313 is because the same branch that has been recognized at S305 should not be again recognized in the next procedure. More specifically, the branch determining procedure is suspended until the search area is moved a distance greater than a predetermined distance. This is confirmed at S301 in the next execution of the routine of FIG. 13.

When the width difference ddXR is not greater than a predetermined value (No at S305), the value at R-Counter is reduced by one at S309 and it is confirmed that the reduced value is below zero at S310. If the renewed value at R-Counter is minus one (Yes at S310), this value is reset to zero at S311. Then, the last width value dXR/old is renewed to the current width value dXR/now at S312. When the value at R-Counter is renewed to zero (Yes at S310), the procedure is advanced directly to S312. The procedure at S312 is also applicable when "No" is the result obtained at S307.

Figure 13:
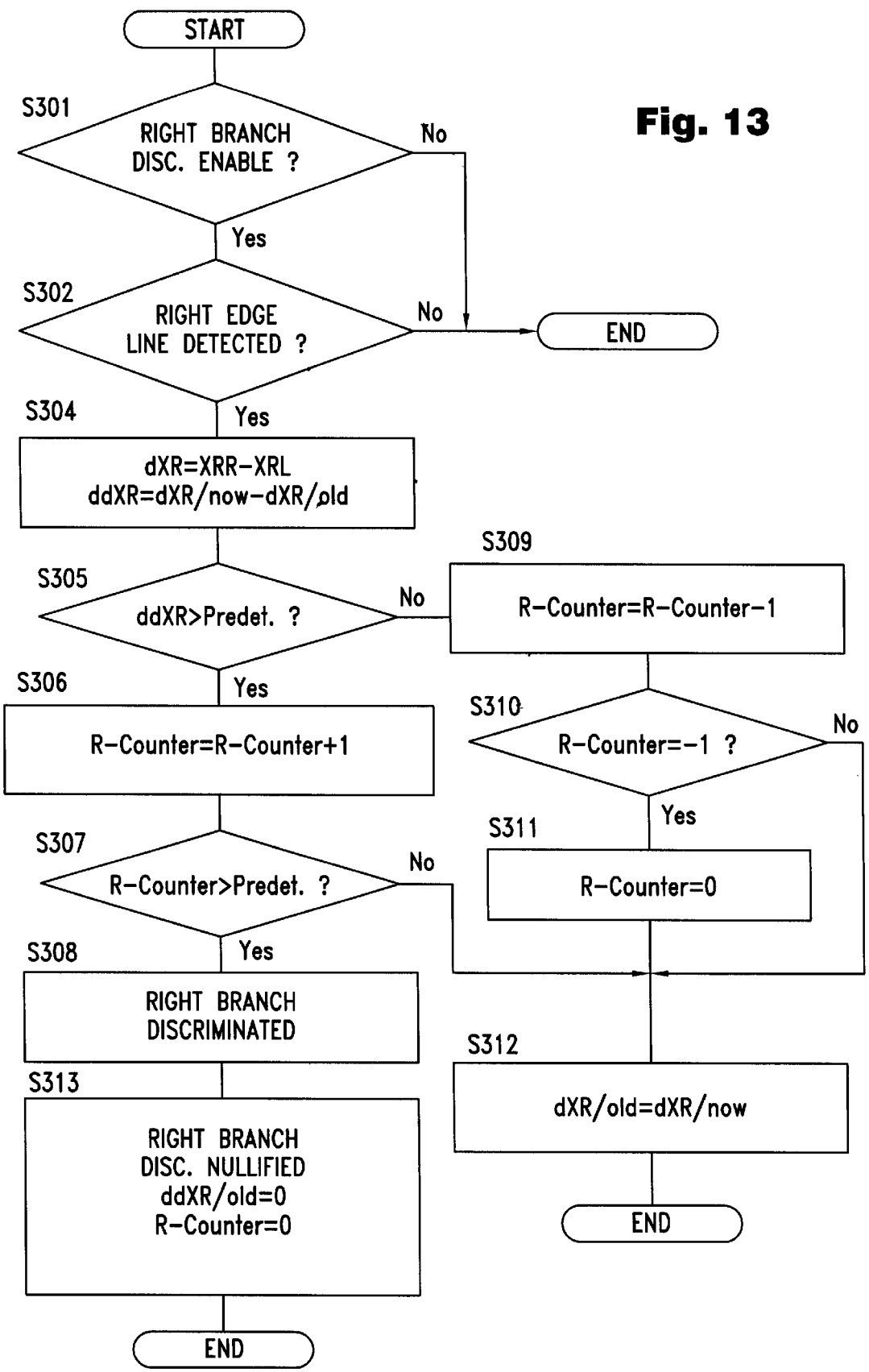
FIG. 13 is a flowchart of branch determination procedure by detection of increase of the line width.
Figure 14:
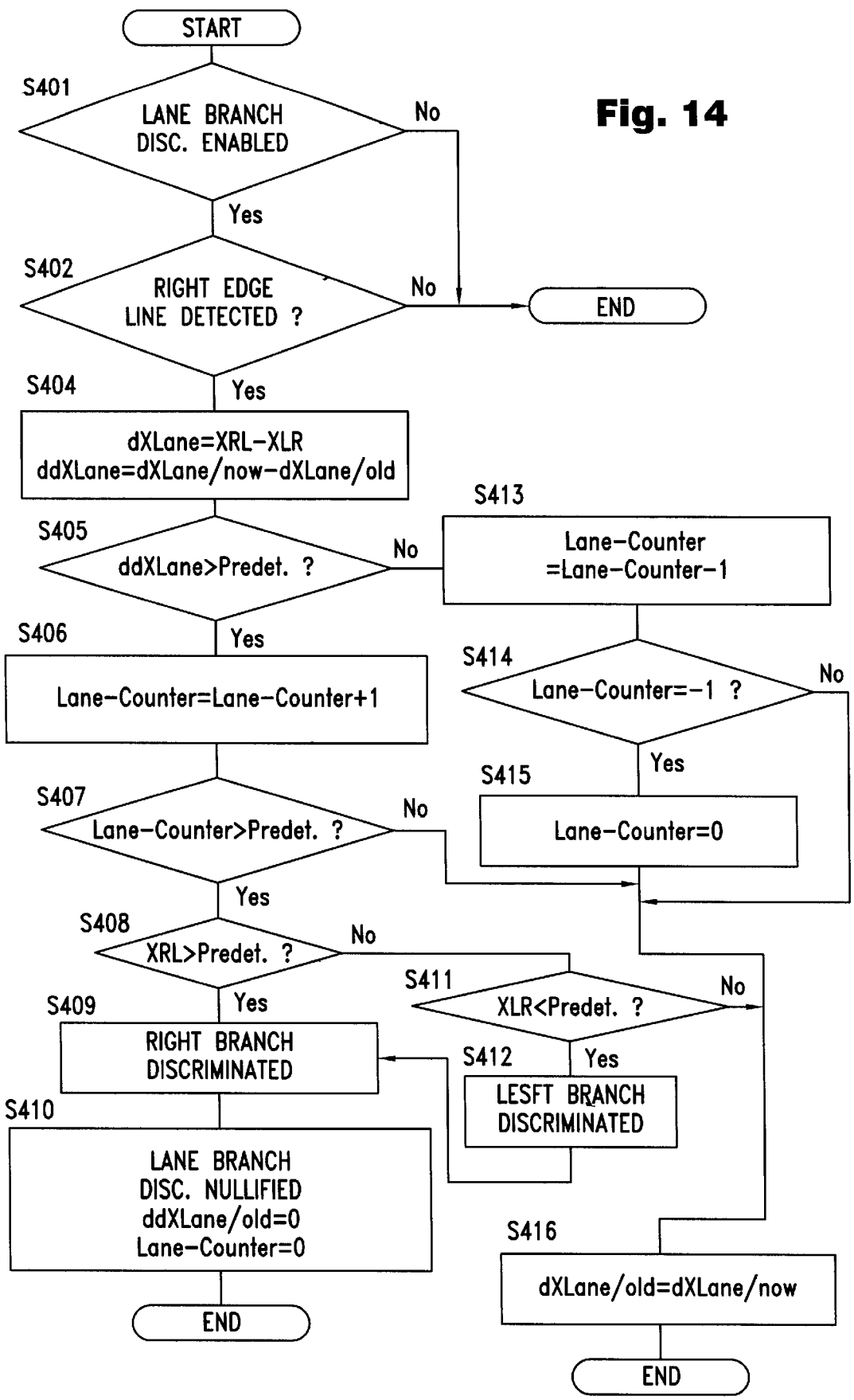
FIG. 14 is a flowchart of branch determination by detection of increase of the lane width.

The flowchart of FIG. 14 illustrates the procedure by which a road branch is determined as a remarkable increase of the lane width, an example of which has been described with reference to FIGS. 11A–11B. The flowchart of FIG. 14 resembles the above-described flowchart of FIG. 13, so that description of similar steps in FIG. 13 is here incorporated. The first two steps S401 and S402 are substantially identical to S301 and S302.

At S404, the lane width dXLane is calculated as dXLane= XRL−XLR, and the lane width difference as ddXLane= dXLane/now−dXLane/old is also calculated, where dXLane/now is the lane width dXLane obtained in the current procedure and dXLane/old is the lane width obtained in the last procedure (routine execution). It is determined at S405 if the lane width difference ddXLane exceeds a predetermined value. This determination cancels a small lane width change to prevent error which could result from uneven width of the lane defined between the opposing white lines 71 and 72. When the lane width difference ddXLane is greater than the predetermined value (Yes at S405), the value of the Lane-Counter is increased by one at S406. The value at Lane-Counter indicates the number of detected width increases of the lane between XRL and XLR. When the lane width difference ddXLane is smaller than the predetermined value (No at S405), the value at Lane-Counter is decreased by one, at S413.

At S407 the value of the Lane-Counter which has been increased by one at S406 is compared with a predetermined value. If it becomes greater than the predetermined value (Yes at S407), which indicates that the lane is widened to a predetermined extent, then it is determined at S408 if the coordinates of XRL have a longitude greater than a predetermined longitude which approximates the maximum longitude Xmax in the search area (see FIG. 10). Where S405 produces "Yes" and S406 produces "No", it can be inferred that the right white line 72 moves to the right and soon disappears from the forward view, which suggests that there is a right-hand branch, but that the vehicle has not left the main road, as determined at S409.

On the contrary, when the longitude of XRL does not exceed the predetermined longitude (No at S408), it is then determined at S411 if the longitude of XLR is smaller than a second predetermined longitude which approximates zero. Where S405 is "Yes", S407 is "No" and S411 is "Yes", it can be inferred that the left white line 71 moves to the left and soon disappears from the forward view, which suggests that there is a left-hand branch, but that the vehicle has not left the main road, as shown by FIGS. 11A–11B, as determined at S412.

When XLR has its longitude greater than the second predetermined longitude (No at S411), it can be confirmed that the lane width is increasing but no branch has yet been recognized. In this case, at S416, dXLane/old is renewed by the current value for use in the next execution. The routine of the flowchart of FIG. 14 is soon restarted.

On the contrary, when a branch road is recognized at S409 or S412, this branch recognition procedure is nullified at S410, and dXLane/old and the value at Lane-Counter are reset to zero for the next branch recognition procedure. The reason why the branch recognition procedure is nullified at S410 is because the same branch that has been recognized at S409 or S412 should not be again recognized in the next execution. More specifically, the branch recognition procedure is suspended until the search area is moved a sufficient distance. This is confirmed at S401 in the next execution of the routine of FIG. 14.

When the lane width difference ddXLane does not reach a predetermined value (No at S405), at S414, the value at Lane-Counter which has been reduced by one at S413 is compared with minus one. When the renewed value at Lane-Counter becomes minus one (Yes at S414), it is reset to zero at S415 and the routine is advanced to S416 where dXLane/old is renewed by the current value for use in the next execution. When the value at Lane-Counter is renewed to zero (Yes at S414), the routine advances directly to S416. The procedure at S416 is also applicable when "No" is the result obtained at S407 or S411.

Figure 15:
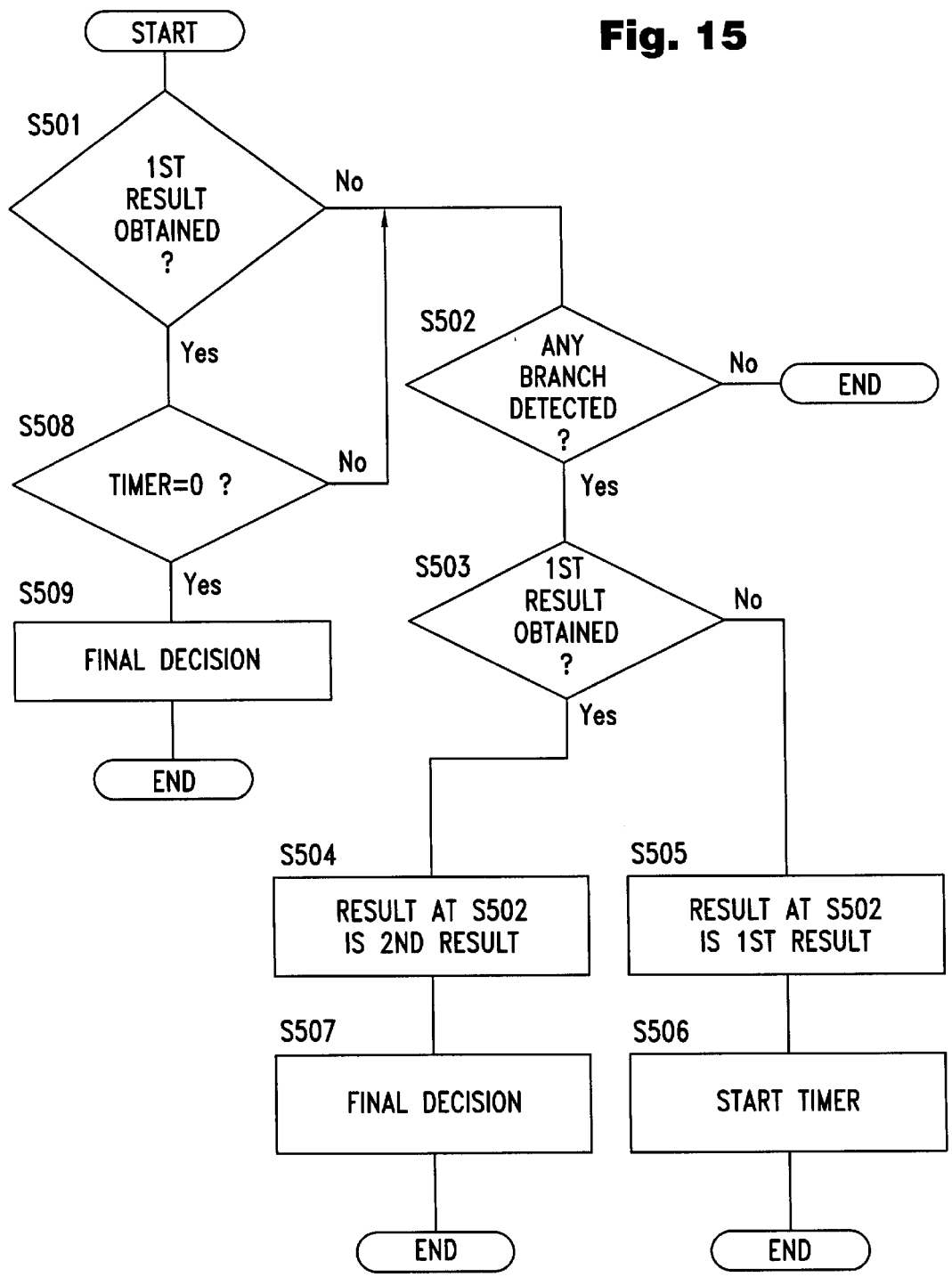
FIG. 15 is another flowchart of branch determination.

The branch recognition routine of FIG. 13 or FIG. 14 is followed by the routine of FIG. 15. It is first determined at S501 if there is already a "fist determination result" which means that some branch has already been detected in the last execution of this routine. If not (No at S501), it is then determined at S502 if some branch has been detected in the branch recognition procedure. If no branch has been detected in the branch recognition procedure (No at S502), the routine is terminated. The determination at S502 reflects the result of the branch recognition procedure of FIG. 13 or FIG. 14 which has been executed for opposing white lines 71 and 72 defining a road along which the vehicle is running. It is also possible that a branch might be detected at both or none of the white lines 71 and 72.

When some branch has been found in the branch recognition procedure (Yes at S502), it is then determined at S503 if there is already a "first determination result" in the last execution of this routine. If not (No at S503), at S505, the detection at S502 is regarded as "the first determination result", and the timer starts counting (reducing from a predetermined count value) at S506. When, on the other hand, there is a "first result" in the last execution of this routine (Yes at S503), the result of the detection at S502 is regarded as a "second determination result", at S504, followed by the final determination, based on the first and second results, which is carried out at S507.

When there is already a "first determination result" (Yes at S501), it confirms that the timer counter which has been started at S506 becomes zero, at S508. If the timer counter is zero (Yes at S508), it means that the results of the second determination can not be obtained in a predetermined period of time (which is determined by the initial count value of the timer) after the first determination result is obtained. More specifically, it means that a branch has been recognized as the first determination result but this is not confirmed by the second determination result in a predetermined period of time. In this case, the final determination is carried out at S509 based solely on the first determination result. The initial count value of the timer should be determined such that it allows the vehicle to run from a point of entrance to the branch road to another point where the branch road is separated to a sufficient extent from the main lane. Accordingly, the timer may be replaced by a distance sensor. When the count value at the timer remains unchanged (No at S508), the routine advances to S502, awaiting the second determination result until the count value becomes zero.

The final determination at S507 and S509 is carried out based on the previously obtained determination result(s), while taking into account the reliability thereof. By way of example, the final determination at S509 may be made by reference to Table I in which only one determination result, i.e., the first determination result, is considered.

TABLE I

| | First Determination Result | Final Decision | Reliability |
|---|---|---|---|
| 1 | Branch at Right detected by Line Width Increase | Left-hand Lane (Main Lane) Selected by Vehicle | Medium |
| 2 | Branch at Left detected by Line Width Increase | Right-hand Lane (Main Lane) Selected by Vehicle | Medium |
| 3 | Branch at Right detected by Lane Width Increase | Left-hand Lane (Main Lane) Selected by Vehicle | Medium |
| 4 | Branch at Left detected by Lane Width Increase | Right-hand Lane (Main Lane) Selected by Vehicle | Medium |

Table II is an example applicable to the final determination at S507 which is carried out in accordance with results of the first and second determinations.

TABLE II

| | First Result | Second Result | Final Decision | Reliability |
|---|---|---|---|---|
| 1 | Branch to Right by Line Width Increase | Branch to Right by Line Width Increase | Drive on Left Lane Main Lane) | High |
| 2 | Branch to Right by Line Width Increase | Branch to Left by Line Width Increase | Drive on Right Lane (Main Lane) | Middle |
| 3 | Branch to Right by Line Width Increase | Branch to Right by Lane Width Increase | Error | |
| 4 | Branch to Right by Line Width Increase | Branch to Left by Lane Width Increase | Error | |
| 5 | Branch to Left by Line Width Increase | Branch to Right by Line Width Increase | Drive on Left Lane (Main Lane) | Middle |
| 6 | Branch to Left by Line Width Increase | Branch to Left by Line Width Increase | Drive on Right Lane (Main Lane) | High |
| 7 | Branch to Left by Line Width Increase | Branch to Right by Lane Width Increase | Error | |
| 8 | Branch to Left by Line Width Increase | Branch to Left by Lane Width Increase | Error | |
| 9 | Branch to Right by Lane Width Increase | Branch to Right by Line Width Increase | Drive on Left Lane (Main Lane) | High |
| 10 | Branch to Right by Lane Width Increase | Branch to Left by Line Width Increase | Drive on Right Lane (Main Lane) | Low |
| 11 | Branch to Right by Lane Width Increase | Branch to Right by Lane Width Increase | Error | |
| 12 | Branch to Right by Lane Width Increase | Branch to Left by Lane Width Increase | Error | |
| 13 | Branch to Left by Lane Width Increase | Branch to Right by Line Width Increase | Drive on Left Lane (Main Lane) | Low |
| 14 | Branch to Left by Lane Width Increase | Branch to Left by Line Width Increase | Drive on Right Lane (Main Lane) | High |
| 15 | Branch to Left by Lane Width Increase | Branch to Right by Lane Width Increase | Error | |
| 16 | Branch to Left by Lane Width Increase | Branch to Left by Lane Width Increase | Error | |

These tables I and II are stored in the memory, one of which is read out in the final determination at S509 or S507, so that the drive direction or a lane selected by the vehicle is determined together with its reliability.

The final decision is taken into account in control operation by the respective control devices 51–59. For example, the final decision in Table I or II teaches a specific one of the roads which has just been selected by the vehicle at the point of junction, which makes it possible to readily obtain the information for the selected road for adequate vehicle control. In another example, the transmission control is started in response to release of the accelerator pedal when the final decision is assigned high reliability, whereas it is started after release of the accelerator pedal, followed by operation of the brake pedal, when the final decision has middle or low reliability.

Reliability of the final decision described in Table I and II may be changed further with reference to detection of the driver's trafficator operation. More specifically, when the driver operates the trafficator and when a specific drive direction indicated by the trafficator coincides with that of the final decision, the rank of its reliability may be increased by one (from "low" to "middle", or from "middle" to "high"). In such case, the final decision may have "high" reliability irrespective of definition in the table. Such vehicle control will be advantageous because it follows the driver's intention. Operation of the trafficator is detected by trafficator sensor 33 which supplies a detection signal to lane recognizing device 60.

Returning to the flowchart of FIG. 7, after the branch determination at S207 is completed, the search area is renewed at S208 which will now be described with reference to the flowcharts of FIG. 16 and FIG. 17. The flowchart of FIG. 16 is applied when the left white line 71 is moved to the left in the forward view, which means that there is a branch to the left but the vehicle has not left the right or main lane.

Figure 16:
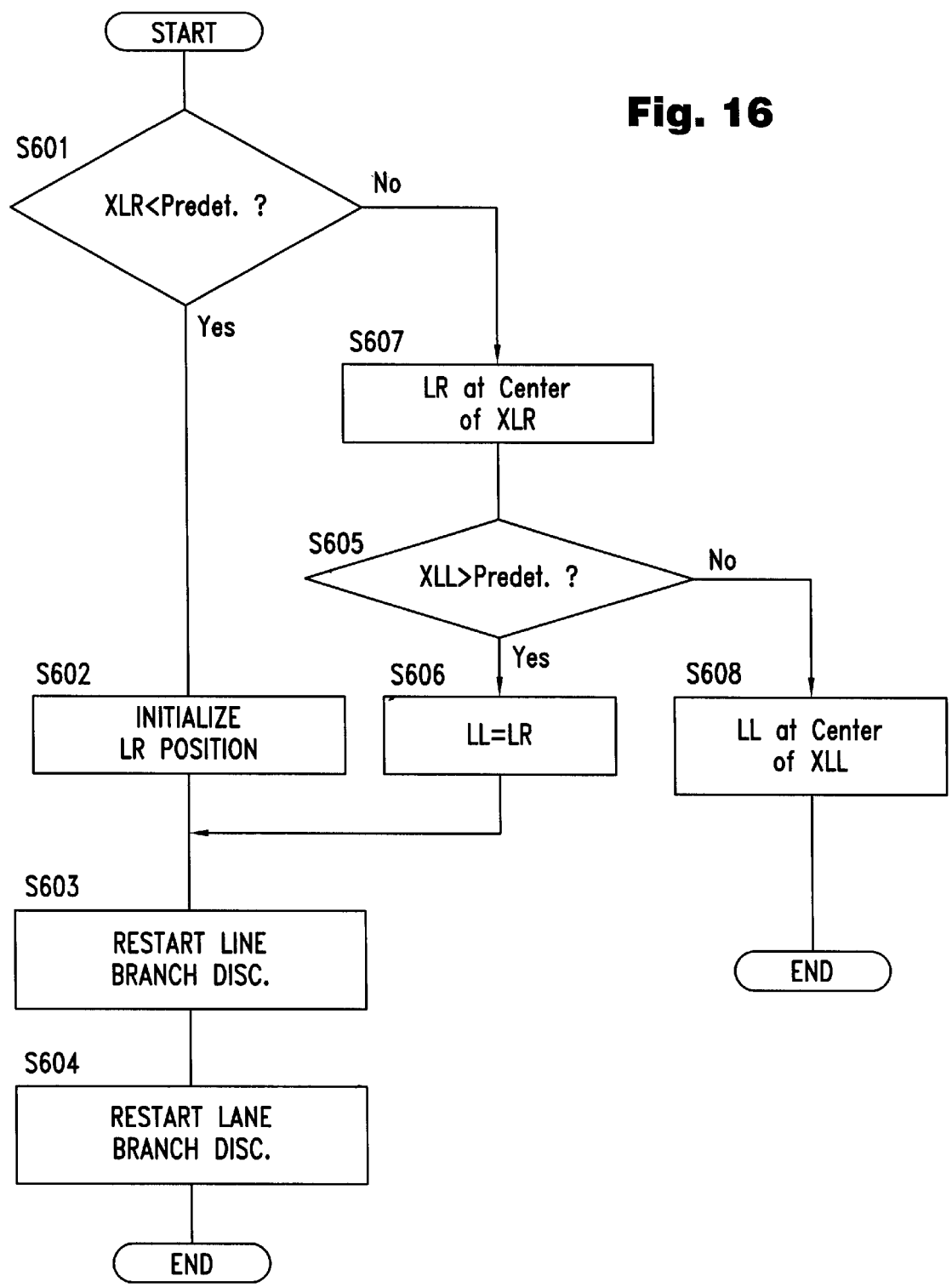
FIGS. 16 and 17 are flowcharts of a search area reset procedure.

In the flowchart of FIG. 16, it is determined at S601 if XLR on the right edge of the left white line 71 has its longitude smaller than a predetermined longitude proximate to zero. If this is the case (Yes at S601), the search area LR is reset to the predetermined initial area in the forward view, at S602. If XLR is located rightward of a predetermined longitude (No at S601), the search area LR is renewed to a position where the center is at XLR, at S607. When XLL on the left edge of the left white line 71 has its longitude larger than the same predetermined longitude (Yes at S605), at S606, the search area LL is renewed to a position identical to the search area LR which has been renewed at S607. On the contrary, when XLL is also located rightward of the predetermined longitude (No at S605), the search area LL is moved to a position having its center at XLL, at S608. When the step S602 or S606 is applied, the search area may be moved to a great extent so that another white line is to be traced in the renewed search area. Accordingly, in this case, the branch determination by the line width increase (by the flowchart of FIG. 13) or by the lane width increase (by the flowchart of FIG. 14) which has been nullified at S313 in FIG. 13 or at S410 in FIG. 14 should restart. Such restart operation is carried out at S603 and S604.

Figure 17:
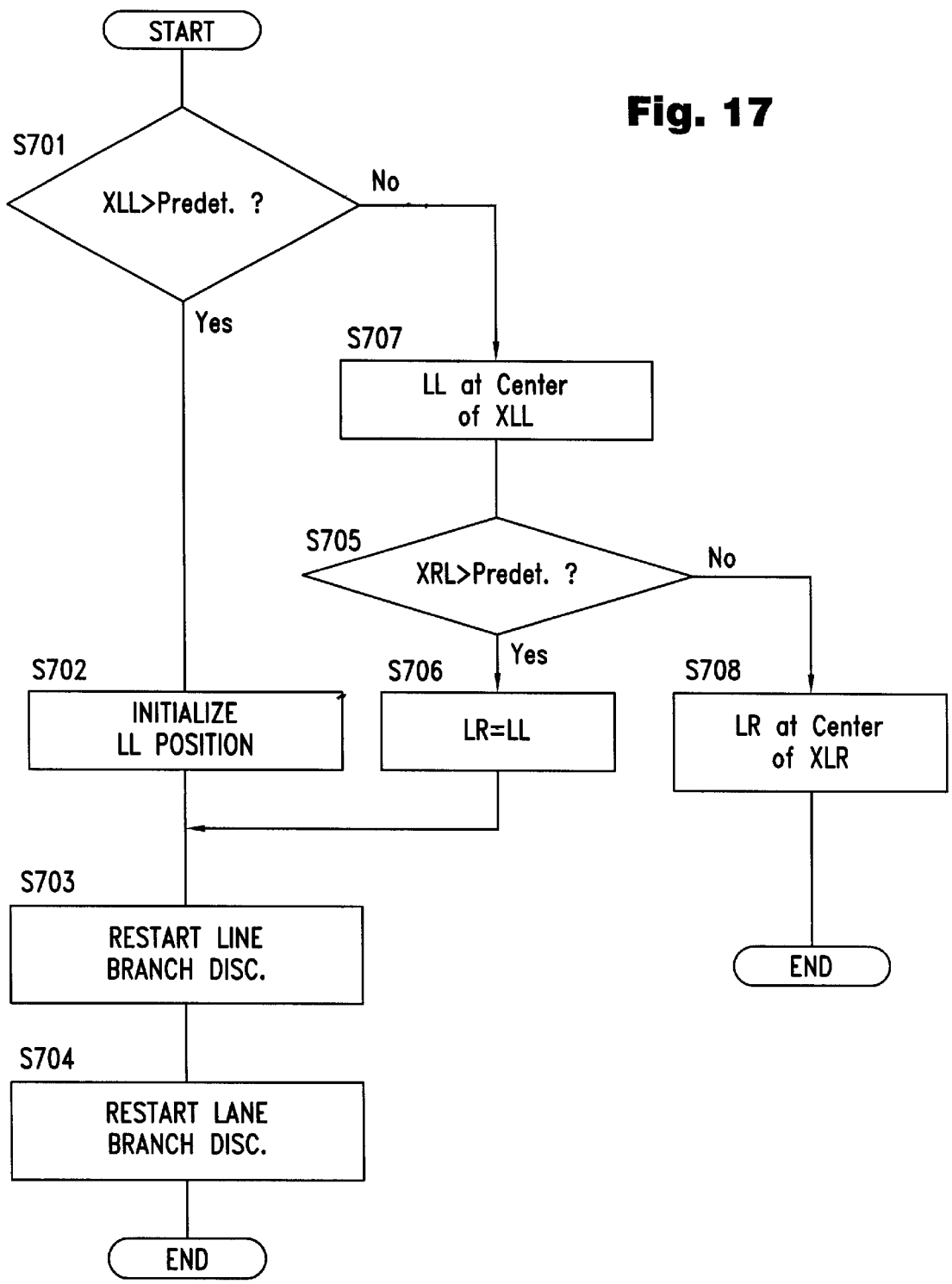

FIG. 17 is the flowchart applicable when the left white line 71 is moved to the right in the forward road picture which means that the vehicle has followed a branch road to the left. It is first determined at S701 if XLL on the left edge of the left white line 71 has its longitude greater than the predetermined longitude proximate to zero. If this is the case (Yes at 5701), the search area LL is reset to the initial position at S702. If XLL is still located rightward of the predetermined longitude (No at S701), the search area LL is shifted to another area centered on XLL, at S707. Then, when XRL on the right edge of the left white line 71 has its longitude larger than the same predetermined longitude (Yes at S705), at S606, the search area LR is renewed to a position identical to the search area LL which has been renewed at S707. On the contrary, when XRL is also located rightward of the predetermined longitude (No at S705), the search area LR is moved to a position centered on XRL, at S708. When the step S702 or S706 is executed, the search area may be moved to a great extent so that another white line is to be traced in the renewed search area. Accordingly, in this case, the branch determination is made valid at S703 and S704, as has been described in connection with S603 and S604 in the flowchart of FIG. 16.

The search area renewal operations by the routines of FIG. 16 and FIG. 17 may be carried out separately or in combination. A similar operation is, of course, carried out with respect to the right white line 72.

In a preferred embodiment, detection by gyromagnetic sensor 13 in navigation system 10 is combined with the lane determination to provide better reliability of results. For example, when the vehicle turns to left or right at the crossing, the previous determination is reset and the routine restarted.

The transmission control may be carried out based on the determination obtained at S207 in the routine of FIG. 7, which will now be described in detail. Navigation processing unit 11 calculates the deceleration demand based on the road information, and then determines the upper limit of the shiftable range of transmission stages depending upon the deceleration demand and the current vehicle speed. A signal indicating the upper limit is supplied to A/T ECU 52. When the lane determination teaches that the vehicle has entered a road or route which is different from the drive route that has been determined by the navigation processing unit 11, NT ECU 52 cancels the old upper limit and operates to obtain a fresh upper limit depending upon the road information for the newly selected route. Similarly, the determination indicating the route change should preferably be taken into consideration in the engine output control by E/G ECU 51, the hydraulic clutch control by 4WD ECU 53, the brake fluid pressure control by ABS ECU 54, the suspension control by suspension ECU 55, the regenerative brake power control by regenerative brake control device 56, etc.

The control by the respective control devices 51–59 may be started responsive to reliability of the branch determination result. For example, when the branch determination is highly reliable ("high" reliability), release of the accelerator pedal is regarded as a driver's decelerating operation. When reliability of the branch determination is "middle", the control starts only after the brake pedal is operated. When reliability is "low", the control does not start until the brake pedal is operated in a manner of a high deceleration demand.

The branch determination may be carried out by lane determining device 60 in another manner, which will be described hereinbelow. Device 60 specifies representative points XLL, XLR, XRL and XRR indicating the left and right edges in the search areas LL, LR, RL and RR with respect to the left and right white lines 71, 72. This may be done in the same manner as has been described in connection with FIGS. 11A–11C and FIGS. 12A–12C. In the forward road picture, the height of the respective search areas should be smaller than a white strip of the dotted lane dividing lines on a speedway.

It is then determined if the width of the left white line 71 is within a predetermined range. The line width is calculated by subtracting XLL from XLR. Then, branch determination, vehicle position determination and lane-change determination are carried out in the order. The branch determination may be carried out by detecting enlargement of white line width and/or lane width, in the manner which has been described in detail. A similar determination is, of course, carried out with respect to the right white line 72.

Further determination is executed when the width of the white line is found to be within a predetermined range. If the line width is not within a predetermined range, the line detected is not a white line but another line to which the procedure is not applicable.

Figure 18:
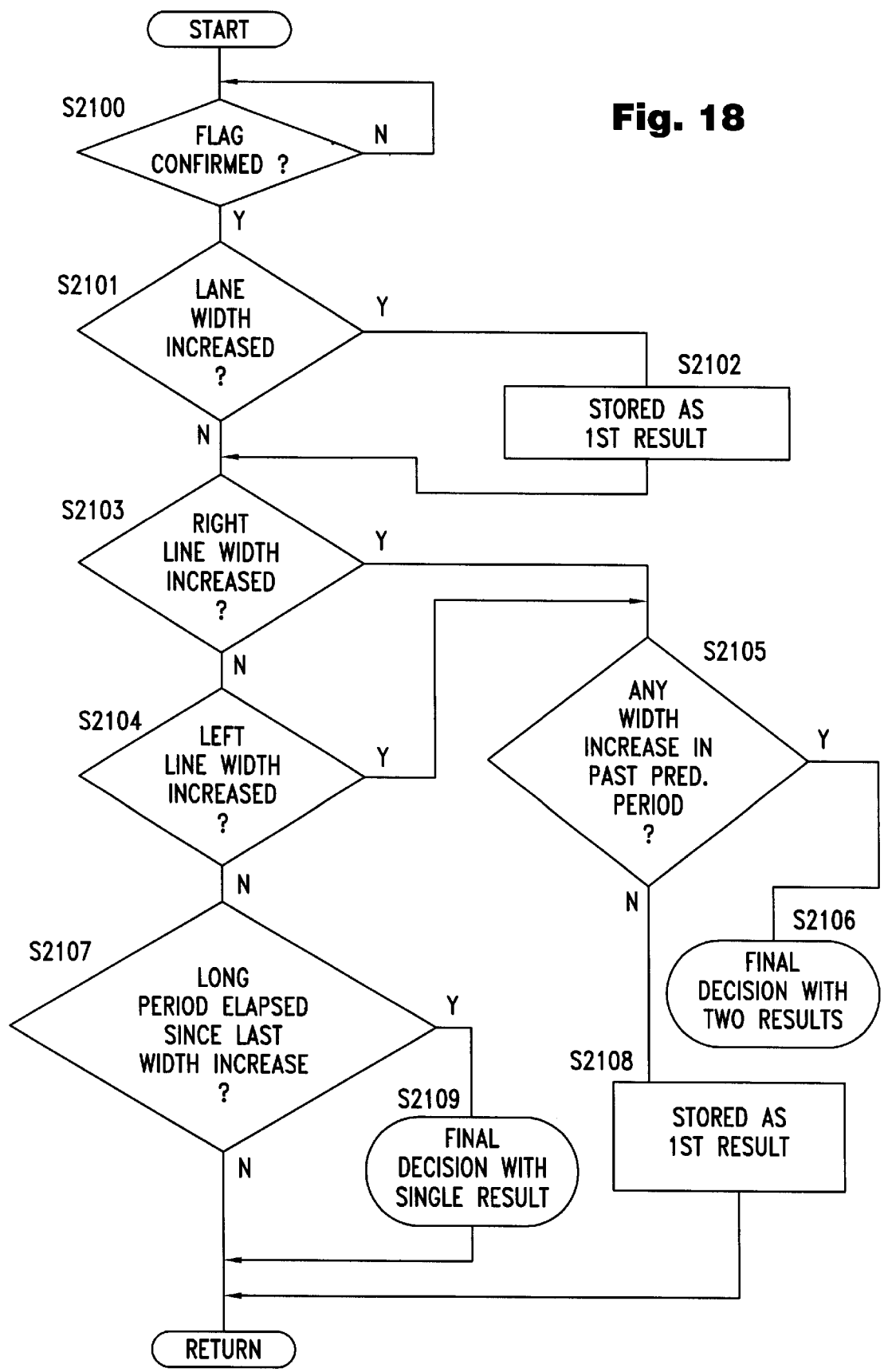
FIG. 18 is a flowchart of another line determination procedure.

The branch determination proceeds as shown by the flowchart of FIG. 18. This branch determination depends upon the width (XLR–XLL) of the left white line 71, the width (XRR–XRL) of the right white line 72 and the lane width (XRL–XLR) to determine which direction or lane is selected by the vehicle.

First, at S2100, a flag indicating a crossing on the road ahead is confirmed. The status of the flag is determined by the road data that is read out from memory 12 by navigation processing unit 11. The flag is set when the vehicle reaches a point a predetermined distance from the nearest crossing ahead. Although the flowchart of FIG. 18 is a preferred example, S2100 may be omitted in a simplified determination.

When the vehicle enters a control region (Yes at S2100), it is determined at S2102 if the width of the lane (XRL–XLR) is increasing during a predetermined period of time from confirmation at S2100. When the lane width is increasing (Yes at S2101), this is stored as the first determination result at S2102. When no lane width increase is detected (No at S2101), it is then determined at S2103 if the width of the right white line (XRR–XRL) is increasing during the same period. When such line width increase is detected (Yes at S2103), the procedure is advanced to S2105. When no increase is detected with respect to the right white line 72 (No at S2103), it is then determined at S2104 if the width of the left white line (XLR–XLL) is increasing during the same period. When such line width increase is detected (Yes at S2104), the procedure is advanced to S2105. When no increase is detected with respect to the right and left white lines 71, 72 (No at S2103 and S2104), the procedure is advanced to S2107.

At S2105, it is determined if at least one of steps S2101, S2103 and S2104 produces a "Yes" result within a lapsed predetermined period of time. If so (Yes at S2105), the final decision is made at S2106 to be described later. If no increase has been detected within the past predetermined period (No at S2105), the procedure is advanced to S2108 where the increase in width of the right or left white line which has been confirmed at S2103 or S2104 is stored as the first determination result.

At S2106, the final decision is made in the branch determination procedure based on the first and second determination results. The first determination result is stored at S2102 and the second is obtained at S2101 or S2103. The final decision is carried out with reference to the following Table III, for example.

TABLE III

| First Determination Result | Second Determination Result | | | |
| --- | --- | --- | --- | --- |
| | Lane Width Increase | Left White Line Width Increase | Right White Line Width Increase | None |
| Lane Width Increase | — | Right-hand | Left-hand | Unknown |
| Left White Line Width Increase | Unknown | Right-hand | Left-hand | (Left-hand?) |
| Right White Line Width Increase | Unknown | Right-hand | Left-hand | (Left-hand?) |

The first and second determination results are applied to Table III to finally determine the direction in which the vehicle move from the junction at S2106. At S2106, one of the final decisions underlined in Table III is obtained with high reliability. For example, the first determination result is detection of a lane width increase and the second determination result is detection of a left white line width increase, and they are applied to Table III to finally determine that the vehicle moves along the right-hand lane or road.

When no increase is detected with respect to the right and left white lines 71, 72 (No at S2103 and 52104), the procedure is advanced to S2107 where it is determined if a predetermined period of time has passed since at least one of steps S2101, S2103 and S2104 produced a "Yes" result. If no line/lane width increase has been detected in the past determination procedure (No at S2107), the procedure is returned to the beginning. If there is some previous detection of the line or lane width increase (Yes at S2107), the procedure is advanced to S2109 where the first determination result is applied to Table III to make a final decision. The final decision at S2109 is any one of those bracketed, which has less reliability in comparison with the final decision at S2106, determined by the first and second determination results.

Figure 21:
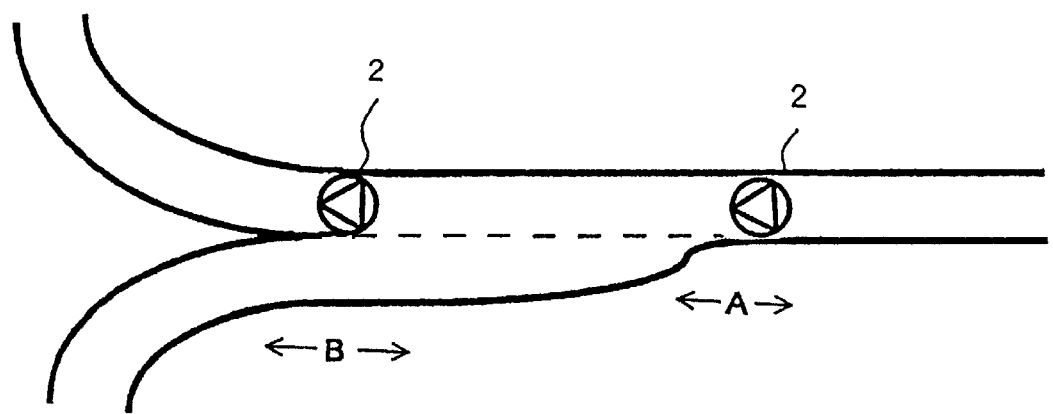
FIG. 21 is an example of a junction on a speedway.

FIG. 21 shows an example of a drive route on a speedway, including two control sections A and B, for an exitway branched off from the main line. While the vehicle 2 is running through the first section A where the exitway starts separating from the main lane, the width increase of the left white line or the lane width increase is detected so as to determine that the vehicle is moving forward along the main lane. This is the first determination result. Then, while the vehicle is running through the second section B where the exitway has completely separated from the main lane, the width increase of the left white line is detected to determine that the vehicle moves to the right along the main lane. This is the second determination result. From these results, it can be definitely confirmed that the vehicle has not exited but moves straight along the main lane on the speedway.

The final decision thus obtained may be used for automatic transmission control in the following manner. In this embodiment, a shiftable range of transmission stages is determined by a command signal from navigation system 10. For example, even if the transmission control device (A/T ECU 52) determines 4th speed, when the shiftable range determined by navigation processing unit 11 specifies the upper limit of 3rd speed, then the transmission stage to be finally determined should be $3^{rd}$.

The manner of automatic transmission control will be described in reference to the flowchart of FIG. 19. Navigation processing unit 11 determines at S2201 if the final decision is based on two results, that is a combination of the first and second determinations. Such a final decision may be any one of those bracketed in Table III. If so (Yes at S2201), which means that the final decision is highly reliable, the procedure is advanced to S2203 where the control level is set to "4". If not (No at S2201), the procedure is advanced to S2202 where it is further determined if the final decision is based on a single result, that is only the first determination, which is bracketed in Table III. If so (Yes at S2202), at S2204, the control level is set to "3". If not (No at S2202), which means that no drive direction could be determined ("unknown" in Table III), the control level is set to "2" at S2205. Though not shown in the flowchart of FIG. 19, there may be a control level "1".

The driver's decelerating operation, which is also referred to in this description as a "starter event", in response to which the automatic transmission control becomes operative, depends on the control level determined by S2203, S2204 and S2205, an example of which is shown in the following table IV.

TABLE IV

| Down-Shift Control | Level 4 | Accel. ON → OFF | | |
| --- | --- | --- | --- | --- |
| | Level 3 | Brake OFF → ON | ← | |
| | Level 2 | Brake ON & Seed-Down | ← | ← |
| Hold Control | Level 1 | Accel. ON → OFF | ← | ← |
| | | Route Decided | Likely | Unknown Unlikely |
| | | Drive Direction Determination | | |

In this table, each control level is accompanied by a starter event at its right-hand column. For example, when the determined drive direction is most reliable so that the control level "4" is obtained at S2203, the transmission down-shift control operates only when the driver releases the accelerator pedal. Of course, in this case, the control also begins with operation of the brake pedal. When the determined drive direction is likely or probable so that the control level is "3" at S2204, the down-shift control does not start in response to detection of release of the accelerator pedal but starts only when detecting that the driver operates the brake pedal, which can be regarded as a stronger indication of the driver's intention to decelerate than release of the accelerator pedal. When the decision is less reliable, that is in the case where S2205 determines the control level "2", initiation of the down-shift control requires consideration of the deceleration of the vehicle speed (detected by sensors 31–33, for example), in addition to operation of the accelerator pedal. When the control level is the minimum, that is "1", though not shown in the flowchart of FIG. 19, the current shift position is maintained even when some starter event occurs.

The above-described automatic transmission control is carried out at S2206 based on the control level (or reliability level) determined at S2203, S2204 or S2205. At this step, navigation processing unit 11 first obtains the road data (node data and segment data) ahead of the current position. If there is a branch or junction within a predetermined distance, the road data of every branched road is obtained. The distance Ll–Ln from the current position to the respective nodes N1–Nn are calculated. Also, the node speeds V1–Vn, which represent the vehicle speeds at which the vehicle can safely and smoothly pass the respective nodes N1–Nn, are determined depending upon the radii r1–rn at the respective nodes. From these calculated parameters, by reference to the map shown in FIG. 5, the deceleration demands Gnn are determined for each node, among which the highest one is selected as the deceleration demand Gn to be applied to the transmission control.

In this embodiment, the deceleration demand Gn to be actually applied to the transmission control is one for the drive route which has been determined at S207 in the flowchart of FIG. 7. For example, when the branch determination at S207 determines that the vehicle has moved to the left at the junction, the deceleration demand Gn should be determined depending upon the road data of the left-hand route. The deceleration demand Gn thus determined by navigation processing unit 11 is supplied to A/T ECU 52 which calculates the optimum transmission speed by reference to a table, an example of which is shown in FIG. 20. Table IV shows that, for example, when the deceleration demand is G1 and the transmission mounted in the vehicle is a 5-speed automatic transmission, the transmission speed should be 4th or lower speed. Such control is carried out in response to detection of the driver's decelerating operation which is determined separately for each reliability level as shown in Table IV.

When no specific drive route after the junction could be determined ("Unknown" in Table III), the transmission control should be carried out based on the road data of the drive route which has been determined by navigation system 10. If no specific drive route has been determined by navigation system 10, it is inferred that the vehicle is running along the current drive route.

The control map of FIG. 20 also shows another type of control to be executed depending upon the deceleration demand, which will be described later in greater detail.

In another modified embodiment, the direction of movement of the vehicle at the junction is determined depending upon the result of branch determination, the result of lane position determination, the result of lane change determination and the position data held in navigation system 10. Branch determination detects the increase of the lane width and/or the white line width to infer a specific direction or lane in which the vehicle is traveling at the junction on a speedway, for example, in the manner previously described.

Lane position determination determines if the white line which has been detected by branch determination is continuous or broken to infer the vehicle position, on the main lane or the branched exitway. This can be carried out by confirming periodicity of line detection. More particularly, it is determined if the line has been detected many times more than a predetermined number during a predetermined cycle period. If this is the case, it is inferred that line detection is "periodic" and the detected line is not continuous but broken or dotted. The predetermined cycle period should preferably be changed with the vehicle speed. It becomes shorter as the vehicle speed increases.

Such lane position determination is carried out with respect to both of the left and right lines to determine that each detected line is continuous or broken or that no line is detected. This is the first determination result. When another determination result is obtained within a predetermined period after the first determination result, the additional determination result is regarded as the second determination result. For example, when the determination result indicates that the white line at the right is a broken line whereas the white line at the left is a solid line, it could be inferred that the vehicle is currently running in a lane adjacent to the left-hand emergency lane on a multi-lane road. When the white line at the left is broken and the white line at the right is continuous, it could be inferred that the vehicle is currently running in a lane adjacent to the median strip. When the opposing white lines are both solid lines, the vehicle is running in a road with a single lane. When both lines are broken, the vehicle is running in a middle lane of the road having at least three drive lanes. Based on the first and second determination results of the lane determination, the direction of movement of the vehicle may also be inferred.

Figure 22:
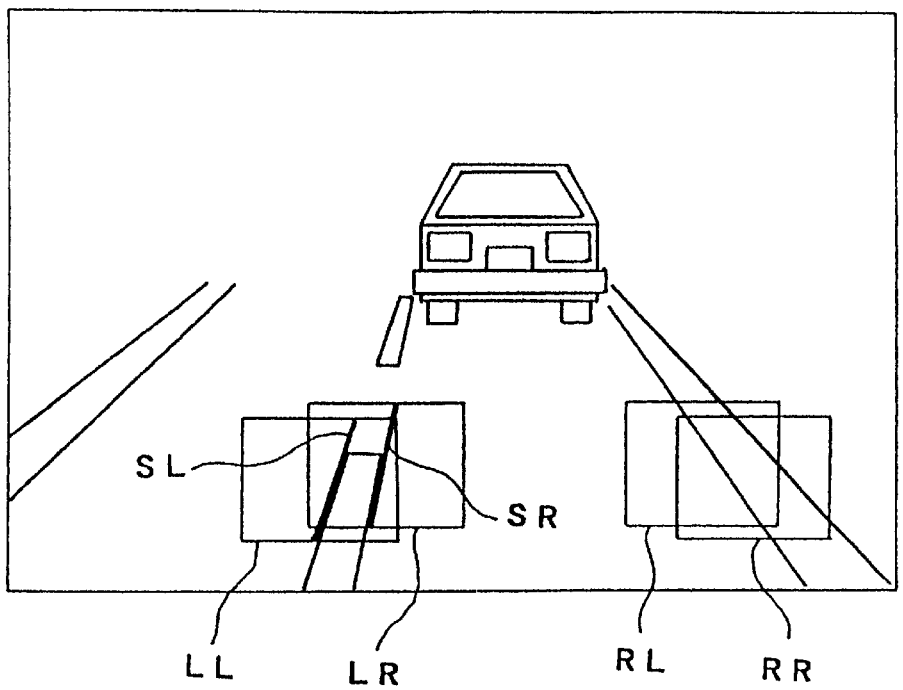
FIG. 22 is an example of a forward road picture in which search areas are also shown.

Lane change determination will now be described with reference to FIG. 22 which shows a lane change from the right lane to the left lane. Since the vehicle has been running in the right lane, the current search areas LL, LR trace the broken line at the left whereas the search areas RL, RR trace the solid line at the right. During the lane change from right to left, the left-hand search areas LL, LR are gradually moved to right, whereas the right-hand search areas RL, RR are gradually moved to left in the forward road picture. When the search areas LL, LR have been moved to right to an extent greater than a predetermined longitude which may be the center line of the picture, as has been described in connection with the preceding embodiments, they are reset to the predetermined initial locations for tracing another left-hand line. Likewise, when the search areas RL, RR have been moved to left to a great extent, they are reset to the predetermined initial locations for tracing another right-hand line. In this case, after reset, the search areas LL, LR and RL, RR begin to trace the solid line at the left and the broken line at the right of the left lane in which the vehicle is about to travel. It should be self-explanatory that a lane change from the left lane to the right lane is determined in like manner.

Figure 23:
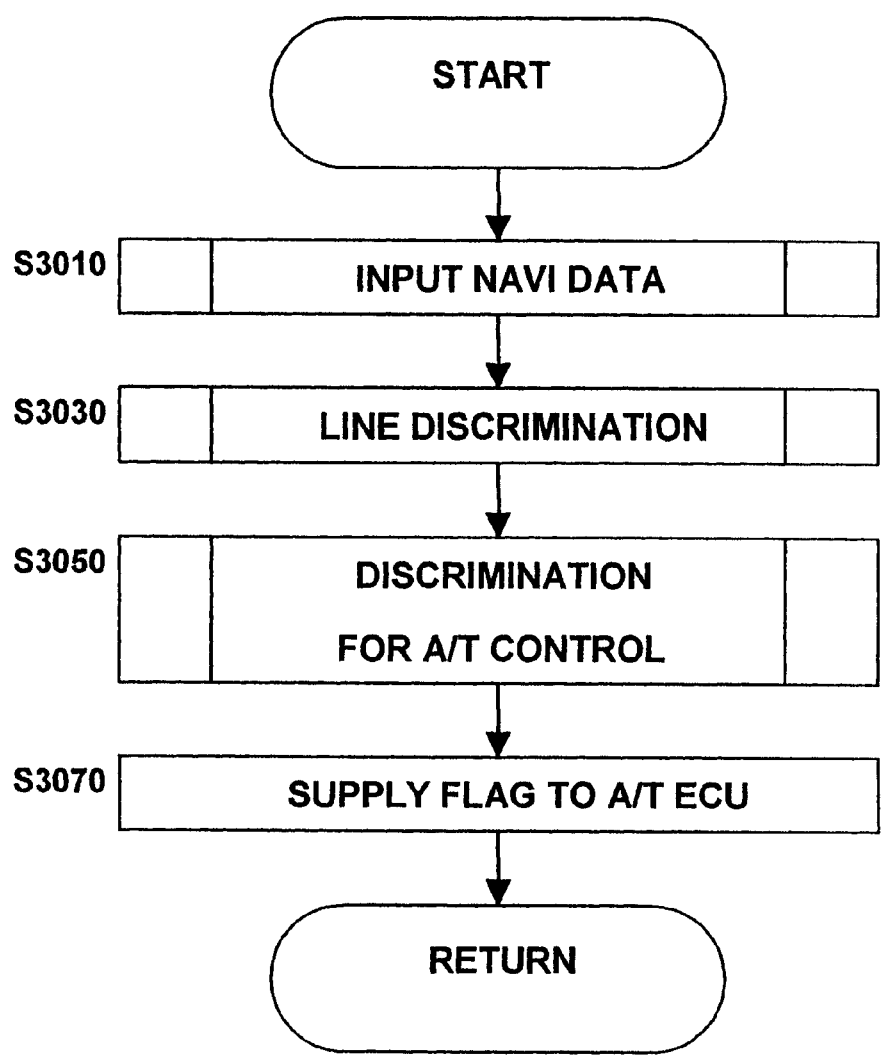
FIG. 23 is a flowchart of a main control routine in still another embodiment.

The flowchart of FIG. 23 represents the main routine of automatic transmission control which follows the above-described determination. At S3010, necessary information is read out from memory 12 in navigation system 10. The information includes data regarding time, current position, nodes and segments on the drive route ahead of the current position, distance, crossings or junctions, the number of lanes, branch angle or direction at each crossing or junction, etc.

Figure 24:
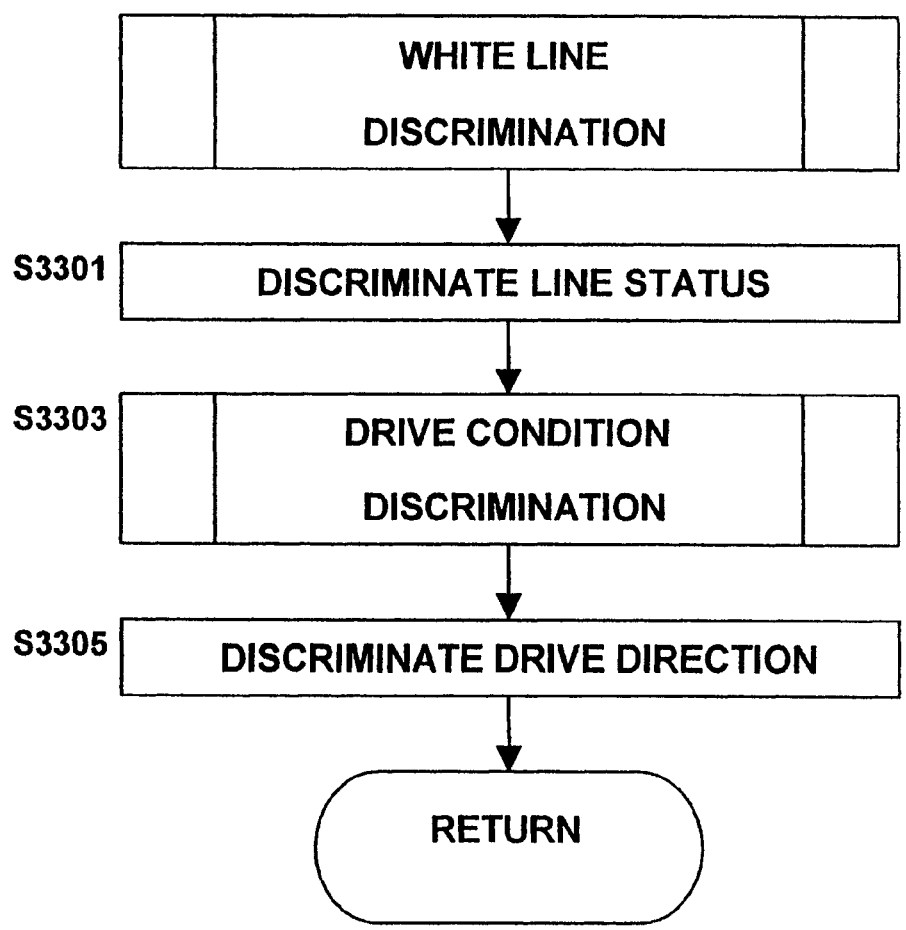
FIG. 24 is a flowchart of a sub-routine for lane recognition in the main routine of FIG. 23.
Figure 25:
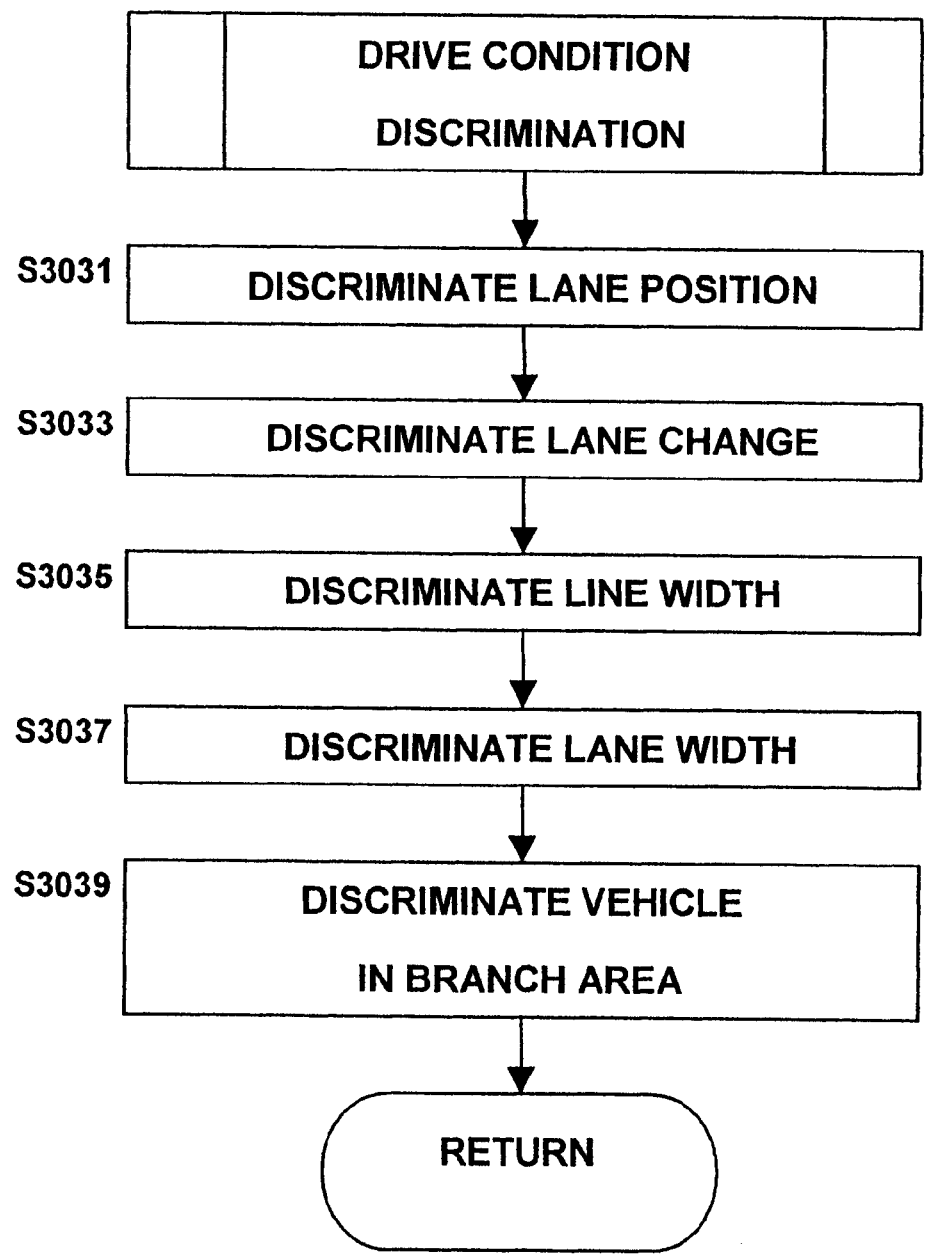
FIG. 25 is a flowchart of a sub-routine for drive position determination in the main routine of FIG. 23.

Next, white line determination is carried out at S3030 which is executed by the routine of FIG. 24. The white line determination starts at S3301 where the front view picture taken by CCD camera 61 (FIG. 6) is analyzed to determine the kind or status (solid or broken) of the opposing white lines shown in the picture. Then, at S3303, the current drive condition is inferred from the results of branch determination, lane position determination and lane change determination, each of which has been described in detail. The flowchart of FIG. 25 illustrates the sub-routine to be executed at S3303. The lane position determination is carried out at S3031 to determine the specific lane in which the vehicle is running. The lane change determination is then carried out at S3033 to determine if there is a lane change. S3035 detects the line width increase or S3037 detects the lane width increase. Based on the current vehicle position data and the junction position data, it is determined at S3039 if the vehicle has entered a control region which starts a predetermined distance astern of the point of junction. In the routine of FIG. 25, the order of the respective steps to be executed is not critical. When determination at S3031, S3033, S3035, S3037 and S3039 finds some result (first determination result), it is filled into a control table, an example of which is shown in the following Table V. When another determination result is found by execution of S3031, S3033, S3035 and S3039 within a predetermined period after the first determination result is obtained, this is applied to a corresponding item in the column of second determination results. For example, when a lane change to the left is recognized at S3031 (as the first determination result) and then that the vehicle is still running in the left-hand lane is detected in S3031 (as the second determination result), these results are applied to Table V to find that this is drive condition No. 9. Both of the first and second determination results may be obtained by different types of determination, or by the same determination (see the drive conditions of Nos. 5, 15, 25 and 26). Data regarding when (time) and where (coordinates) the first and second determination results are obtained are also filled in Table V, though not shown therein. Of course, Table V is merely one example of a data table to be used for determining the current drive condition based on the first and second determination results occurring within a predetermined time and distance interval. In another example, the operative condition of a trafficator detected by trafficator sensor 34 may be considered as the first or second starter event, because it is indicative of the driver's affirmative intention to decelerate.

TABLE V

| | Determination | | Likelihood Point | | |
| --- | --- | --- | --- | --- | --- |
| | 1st Result | 2nd Result | Left | Center | Right |
| 1 | enter branch area | run on left lane | 1 | 0 | 0 |
| 2 | within branch area | keep left lane | 2 | 0 | 0 |
| 3 | run on left lane | lane width increase | 1 | 0 | 1 |
| 4 | run on left lane | right line width increase | 3 | 0 | −2 |
| 5 | left line width increase | right line width increase | 2 | 0 | −2 |
| 6 | left line width increase | lane change to left | 2 | 0 | −2 |
| 7 | lane width increase | lane change to left | 2 | 0 | −2 |

TABLE V-continued

| | Determination | | Likelihood Point | | |
| --- | --- | --- | --- | --- | --- |
| | 1st Result | 2nd Result | Left | Center | Right |
| 8 | lane change to left | right line width increase | 3 | 0 | −3 |
| 9 | lane change to left | run on left lane | 3 | 0 | −2 |
| 10 | | | | | |
| 11 | enter branch area | run on right lane | 0 | 0 | 1 |
| 12 | within branch area | keep right lane | 0 | 0 | 2 |
| 13 | run on right lane | lane width increase | 1 | 0 | 1 |
| 14 | run on right lane | left line width increase | −2 | 0 | 3 |
| 15 | right line width increase | left line width increase | −2 | 0 | 2 |
| 16 | right line width increase | lane change to right | −2 | 0 | 2 |
| 17 | lane width increase | lane change to right | −2 | 0 | 2 |
| 18 | lane change to right | left line width increase | −3 | 0 | 3 |
| 19 | lane change to right | run on left lane | −2 | 0 | 3 |
| 20 | | | | | |
| 21 | enter branch area | run on center lane | 0 | 1 | 0 |
| 22 | within branch area | keep center lane | 0 | 2 | 0 |
| 23 | left line width increase | nothing | −1 | 1 | −1 |
| 24 | right line width increase | nothing | −1 | 1 | −1 |
| 25 | left line width increase | left line width increase | −1 | 3 | 1 |
| 26 | right line width increase | right line width increase | 1 | 3 | −1 |
| 27 | lane change to left | run on center lane | 1 | 1 | 0 |
| 28 | lane change to right | run on center lane | 0 | 1 | 1 |

Figure 26:
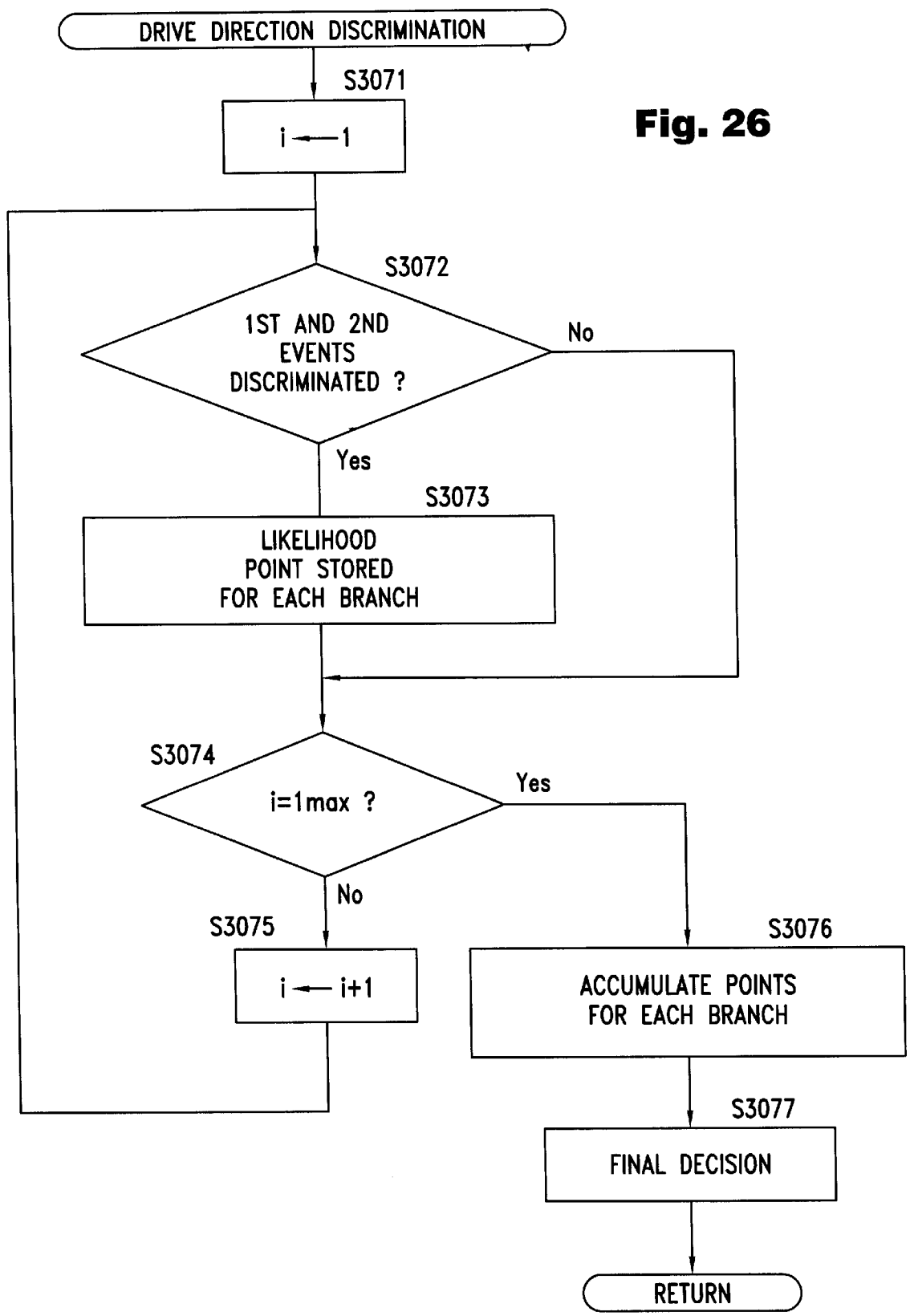
FIG. 26 is a flowchart of a sub-routine for branch determination in the main routine of FIG. 23.

Returning to the routine of FIG. 24, after the current drive condition is determined at S3303 by reference to the data table of Table V, the drive direction is finally determined at S3305 which is executed in the routine of FIG. 26. More specifically, the respective drive conditions in Table V each have a likelihood rating concerning the respective drive direction. For example, when drive condition No. 9 is selected by the first and second determination results, it is inferred that the vehicle most probably has moved to the left at the junction and it would be unlikely that the vehicle has moved to right. The likelihood rating is stated as an integral number. A drive direction with a greater number suggests higher likelihood. A negative number indicates an unlikely drive direction.

At S3071 in the routine of FIG. 26, "1" is input to the index (i). The index (i) indicates the drive condition number in Table V. Then, it is confirmed at S3072 if the first and second determination results defined by the drive condition of a corresponding index number, have been determined by executing the routine of FIG. 25. In other words, it is determined if there is an applicable drive condition in the current drive situations. Since the index number is "1", it is then determined if No. 1 drive condition is applicable or not. If so (Yes at S3072), the likelihood points defined in the same row are stored at S3073. The likelihood points are respectively stored for the directions "left", "center" and "right" to which the vehicle moves. 53074 and S3075 mean that a combination of S3072 and S3073 is successively applied to the drive conditions from the first to the last (No. 28 in this example). The likelihood points are accumulatively stored in each of the memory sections "left", "center"

and "right". When all of the drive conditions have been subjected to the likelihood point accumulation (Yes at S3074), the respective total points are confirmed at S3076. Then, the drive direction is finally anticipated at S3077 by the accumulated likelihood points indicating "left", "center' and "right" directions, by reference to the following Table VI, for example. In Table VI, P represents the accumulated likelihood points, and P1, P2 and P3 are predetermined points (P1>P2>P3).

TABLE VI

| Reliability   | Accumulated Point Range | Level |
|---------------|-------------------------|-------|
| Most Reliable | P > P1                  | 4     |
| Likely        | P1 ≧ P > P2             | 3     |
| Unknown       | P2 ≧ P > P3             | 2     |
| Unlikely      | P3 ≧ P                  | 1     |

Figure 27:
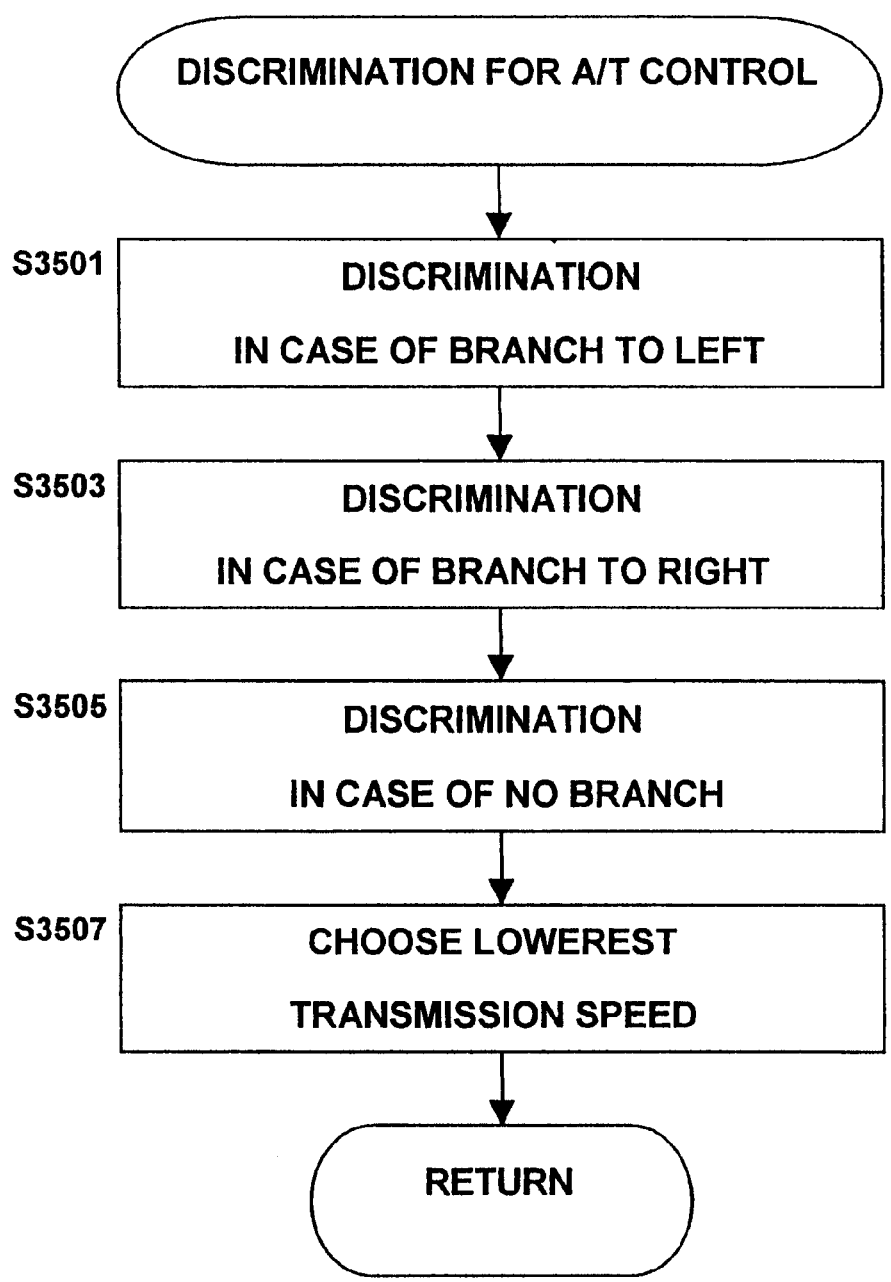
FIG. 27 is a flowchart of an automatic transmission control.

Again referring to the flowchart of FIG. 23, determination for automatic transmission control is executed at S3050, and a flag representing the result of that determination at S3050 is supplied to A/T ECU 52 at S3070. At 3050, as shown by the flowchart of FIG. 27, a determination is executed with respect to the left-hand branch road or lane (at S3501), the right-hand branch road or lane (at S3503) and the center road or lane (at S3505), respectively. Since each determination procedure is substantially identical, only the determination procedure at S3501 is described in detail with reference to the flowchart of FIG. 28. At first, at S5011 the distances L1–Ln to the respective nodes N1–Nn are calculated from the node data for the left-hand branch road, the recommended node speeds V1–Vn for passing through the respective nodes are calculated from the radii r1–rn, and the greatest deceleration demand Gn with respect to a specific node is determined from the map of FIG. 5 by application of the distance Ln, the current vehicle speed V0 and the recommended node speed Vn. The manner of such calculation and determination has been described in detail and therefore is not repeated here.

Figure 19:
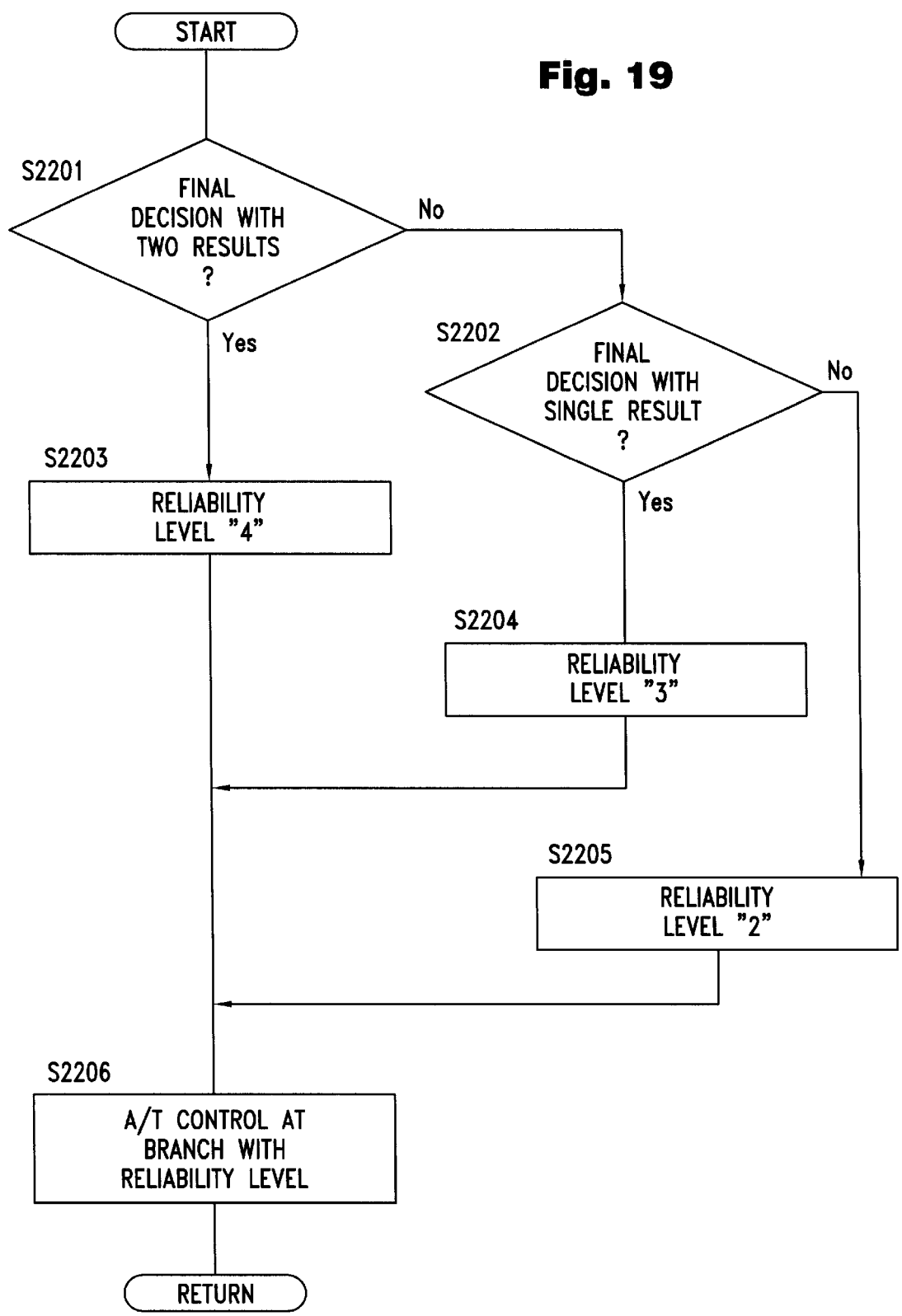
FIG. 19 is a flowchart of a reliability inference procedure to be carried out in response to the results of the line determination of FIG. 18.

At S5012, S5014 and S5016, the control level which has been determined by execution of the routine of FIG. 19 (at S2203, S2204 or S2205) by reference to Table IV is confirmed. Relationship between the control level and the starter event which initiates the automatic transmission control has been described with reference to Table IV. When the control level is "4" (Yes at S5012), the transmission control is initiated when either release of the accelerator pedal or operation of the brake pedal is detected. Accordingly, the deceleration demand Gn which has been determined at S5011 should be considered in both events, which is confirmed at S5013. When the control level is "3" (Yes at S5014), the transmission control initiates only when braking, so that the deceleration demand Gn should be considered only in the event of braking, and the smallest deceleration demand Gn is set to the event of releasing the accelerator pedal, at S5015. When the control level is "2" (Yes at S5016), the transmission control initiates only when the event of braking is detected while the vehicle is decelerated at a rate greater than a predetermined rate, to which the deceleration demand Gn is applied at S5017. In this case, the smallest deceleration demand Gn is set to the event of releasing the accelerator pedal and also to the event of merely operating the brake pedal with a slower depression rate, which means that no special automatic transmission control depending upon the deceleration demand Gn is applied even when detecting such event. When the control level is "1" (No at S5012, S5014 and S5016), in which case the current shift position is maintained even when detecting release of the accelerator pedal or operation of the brake pedal, the smallest deceleration demand G0 is set to the respective events at S5018, which means that no transmission control depending upon the deceleration demand Gn is carried out in this case either.

The results obtained at S5013, S5015, S5017 and S5018 with respect to the left-hand branch road, the right-hand branch road and the center road are converted into flag information, which is supplied to A/T ECU 52. A/T ECU 52 operates by application of the deceleration demand Gn (or G0) to the data table of FIG. 20 to determine the upper limit of the shiftable range of transmission speeds. Actual transmission control is initiated when detecting a predetermined type of "starter event".

Figure 28:
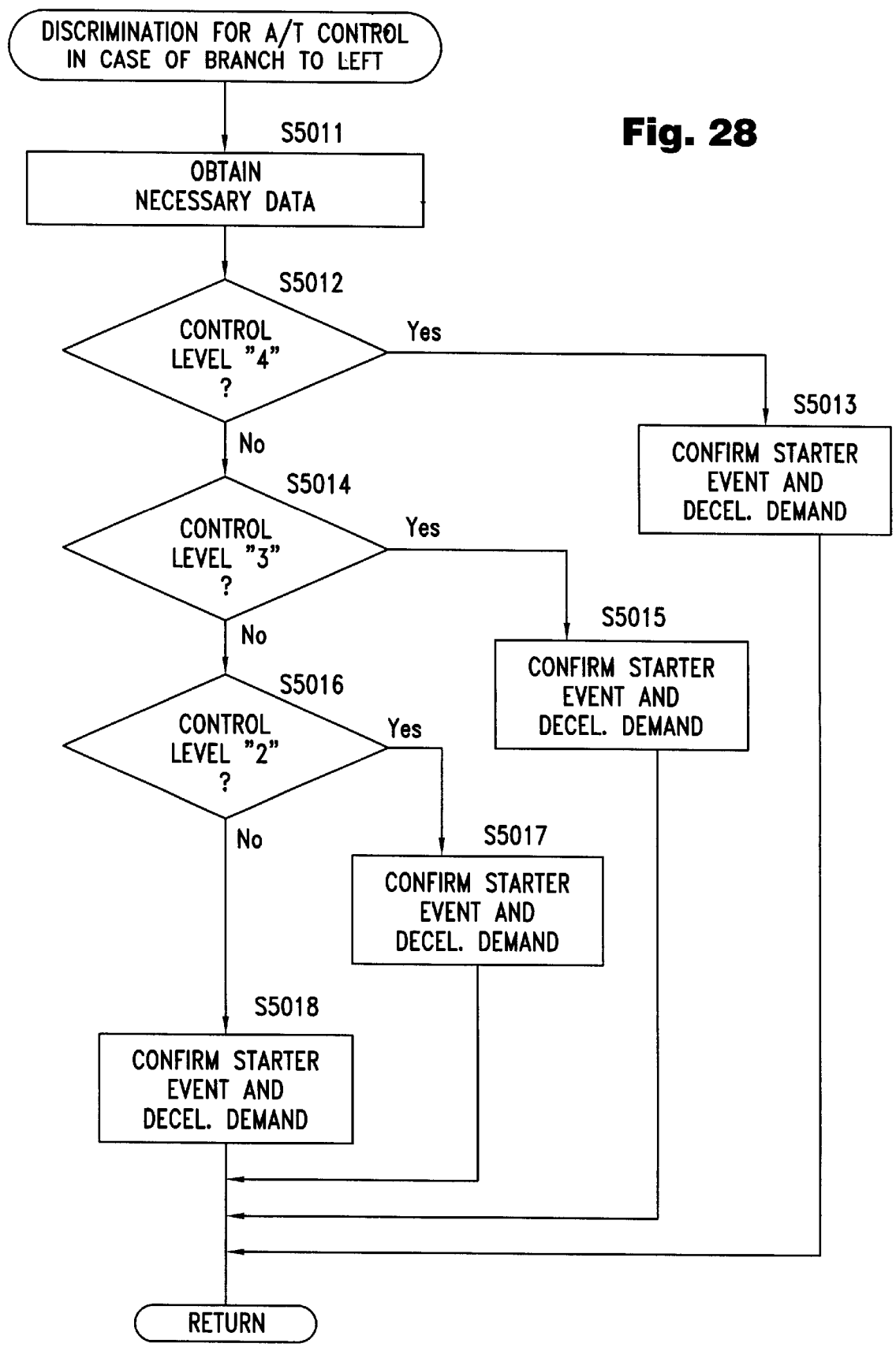
FIG. 28 is a flowchart of a sub-routine for deceleration demand determination in the main routine of FIG. 27.

In the above-described manner, by execution of the routine of FIG. 28, the optimum transmission speed under control and the starter event for initiating such transmission control are determined with respect to the left-hand branch road, the right-hand branch road and the center road, respectively. The results may be different. For example, the results may indicate that it is most likely that the vehicle remains in the center lane in which case the transmission speed may be 5th, but it may be possible that the vehicle has branched off to the left or right in which case the transmission speed should be 4th or lower speed. At S3507 in the routine of FIG. 27, the lowest transmission speed is adopted. In the above case, the transmission is controlled so as to prevent up-shift to 5th. This provides safety even if the driver selects a drive route other than estimated by the above-described procedure.

Although the automatic transmission control has been described in greater detail, another type of control may be carried out in like manner in dependence upon the deceleration demand Gn, as shown in the control map of FIG. 20. More particularly, the deceleration demand Gn which has been determined by navigation processing unit 11 will, in turn, determine the contents of control made by E/G ECU 51, 4WD ECU 53, ABS ECU 54, SUS ECU 55, RBC ECU 56, VSC ECU 57, TRC ECU 58, ASC ECU 59, etc.

For example, 4WD ECU 53 receives the deceleration demand Gn and controls engagement or disengagement between the drive shaft and the hydraulic clutch. As shown in FIG. 20, when the deceleration demand Gn is high, which means the corner ahead is tight, the hydraulic clutch is more fully engaged with the center differential to provide a greater oil pressure therein. Also utilized in this control is the forward corner data supplied from navigation processing unit 11, which indicates the curvature of the corner ahead of the current position on the drive route, which can be calculated from the radii r1–rn at the respective nodes N1–Nn. When the road ahead is straight with no corner within a predetermined distance from the current position, the forward corner data is assigned RO. When there is a corner, the forward corner data is assigned R1, R2 or R3 depending upon the curvature. The forward corner of the greater curvature, which means a gentle curve, is assigned Ri, whereas a tight curve is assigned R3. In control by 4WD ECU 53, the clutch tends toward "direct coupling" as the forward corner data changes in the order of R3→R2→R1→RO indicating a more gentle corner. When the corner becomes tight, the clutch tends to become more fully engaged with the center differential to effectively absorb the difference in rotation of front and rear wheels.

With the above control, even if one of the wheels slips when braking with high deceleration demand Gn, the drive torque is duly transmitted to the remaining three wheels so that the vehicle can decelerate in a stable manner. When a signal indicating that ABS is in operation is supplied from brake control device 54, the hydraulic clutch should preferably be made inoperative to avoid "wheel lock" during braking.

FIG. 20 also shows brake control in which the brake fluid pressure is increased, in response to detection of some starter event, by an amount determined by the deceleration demand Gn. This assists and improves the braking power by the driver's operation of the foot brake pedal.

SUS ECU 55 controls the attenuation power in the suspension such that it is increased, in response to detection of some starter event, by an amount determined by the deceleration demand Gn. This prevents "nose diving" of the vehicle which would otherwise be caused by panic braking, for example. The suspension control may be carried out in such manner that the attenuation power is changed depending upon the forward corner data R0, R1, R2, R3 which has been described in connection with 4WD control. The data indicating direction of the corner may also be utilized in such control to change the attenuation power at the left and at the right. For example, when data indicates that there is a very tight corner to the right, in response to detection of a predetermined starter event, the suspension control device 55 executes control in such manner that the right-hand attenuation depends upon the deceleration demand Gn and the left-hand attenuation is somewhat higher than the right-hand attenuation. The difference between the attenuations at opposite sides may be determined in dependence upon the current vehicle speed and the curvature of the forward corner. This manner of control will prevent or alleviate "rolling" during driving around a tight corner and improve stability of the vehicle.

GBC ECU 56 may operate in response to detection of a predetermined starter event to determine regenerative brake power in accordance with the deceleration demand Gn. Supply of a larger deceleration demand will produce a higher regenerative brake power, to assist the driver's braking operation.

VSC ECU 57 operates in response to detection of some driver's decelerating operation to control the brake fluid pressure and the throttle opening, in accordance with the deceleration demand Gn. This improves drive stability even during a sudden deceleration.

Although not shown in FIG. 20, when a four-wheel steering (4W5) control device is mounted on the vehicle, it is preferred that, when the deceleration demand Gn is above a predetermined level, 4W5 control is made inoperative in response to detection of some starter event.

ASC ECU 59, when detecting a driver's decelerating operation which may be inferred by lane change, turning-on of the trafficator, rotation of the steering wheel beyond a predetermined angle, etc. within a predetermined distance astern of the next forward branch, junction or curve, controls the throttle opening and/or the upper limit transmission speed so as to decrease the vehicle speed to below the control speed. For example, when the vehicle running at a constant speed (say 100 km/hour) that has been determined by speed control device 59 enters a control region just before a very tight curve for which the largest deceleration demand G7 has been determined, speed control device 59 operates to reduce the throttle valve opening by 70% and to set the upper limit transmission speed to 3rd, thereby automatically reducing the vehicle speed, even if the driver does not cancel the speed control operation. After passing through the branch or curve, the vehicle speed may be automatically increased and returned to the control speed, say 100 km/hour. Deceleration control may be effected by any other means, for example, by the anti-braking system (ABS) or by the traction control system (TRC).

A power steering control device may be controlled whereby, for example, more power assist is applied in response to detection of a driver's decelerating operation, where the deceleration demand Gn is above a predetermined level.

The concept underlying the present invention may be applied to the route searching in navigation system 10. In this embodiment, the determination results regarding the current lane position and/or lane change should be considered in addition to the other parameters usually used in the route finding operation, which has not been practiced in a prior art navigation system.

Figure 30:
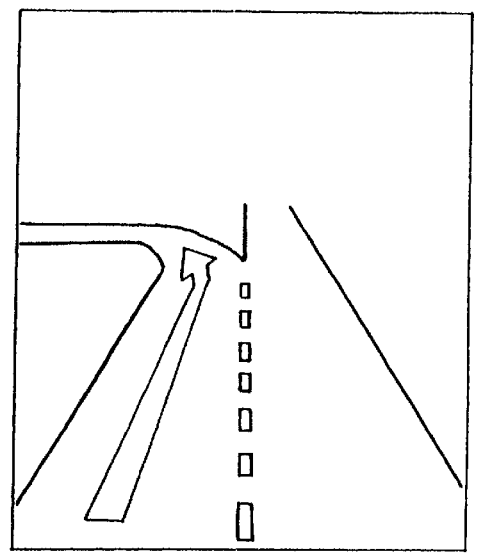
FIG. 30 is an example of a picture of the junction displayed utilizing the junction data.

In this embodiment, navigation system 10 stores picture data for representing pictures at junctions, an example of which is shown in FIG. 30 in which the selected drive direction is indicated. When the vehicle is running along the drive route determined by navigation system 10 and now reaches a predetermined distance astern of a junction, a picture such as shown in FIG. 30 is displayed on display 17 in accordance with the junction data and, at the same time, voice navigation is output through voice output unit 19 such as "the drive route is branched off to left", for example.

Figure 29:
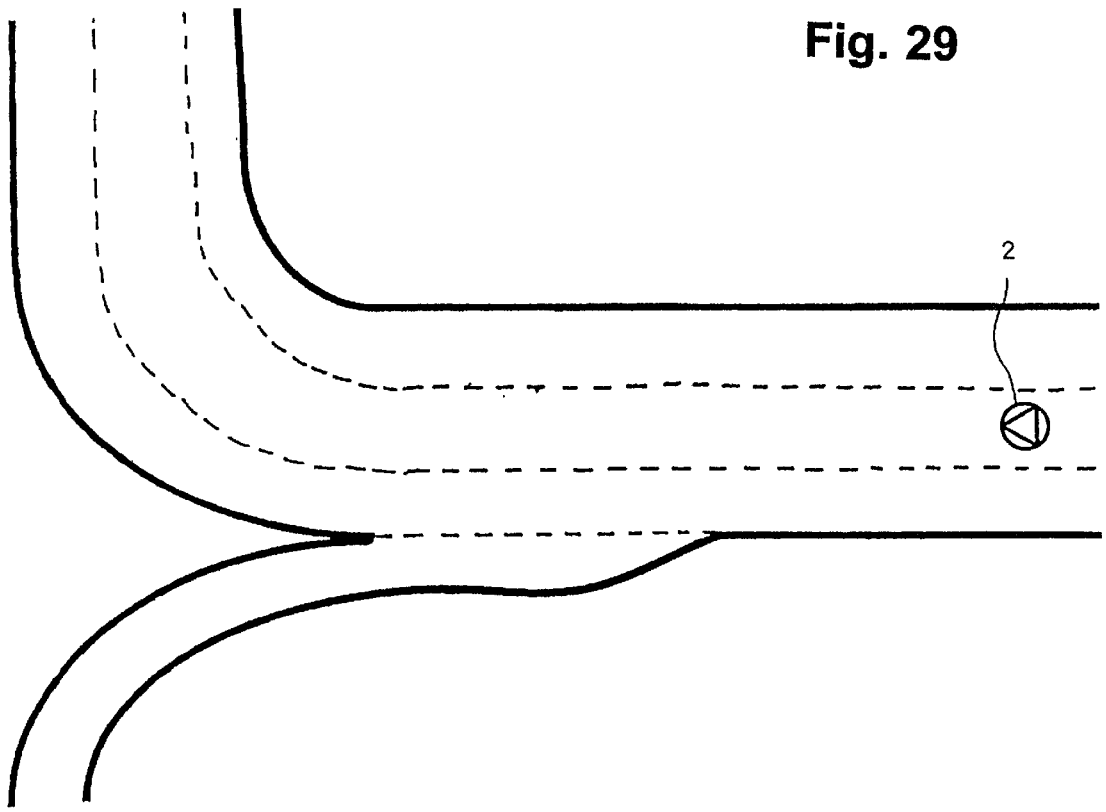
FIG. 29 shows an example of a 3-lane speedway with a branch leading to an exit.

FIG. 29 shows that the vehicle is running along a drive route that is a 3-lane speedway and approaches a point of junction where an exitway is branched off. Suppose that, in accordance with the drive route which has been determined by navigation system 10, the vehicle should move to right along the main road. Table VII defines the content of the voice guidance to be given in this case, which should be determined by the current position detected by sensor 13 and the determination of the drive lane.

TABLE VII

| Current Position | Drive Lane | | | |
| --- | --- | --- | --- | --- |
| | Exit Way | Left | Center | Right |
| 2 km | — | Go to right at junction 2 km ahead. Keep lane. | Go to right at junction 2 km ahead. Keep lane. | Go to right at junction 2 km ahead. Keep lane. |
| 700 km | — | Go to right at junction 700 m ahead. Keep lane. | Go to right at junction 700 m ahead. Keep lane. | Go to right at junction 700 m ahead. Keep lane. |
| 300 km | — | Go to right at junction 300 m ahead. Keep lane. | Go to right at junction 300 m ahead. Keep lane. | Go to right at junction 300 m ahead. Keep lane. |
| 0 m | — | Go to right at this junction Keep lane. | (No Guidance | (No Guidance) |
| Exit Way (Probable) | Go to right at this junction. Lane change to right. | — | — | — |
| Exit Way (Reliable) | Go astray. Another route is searching. | — | — | — |
| Main Road (Probable) | — | (No Guidance) | (No Guidance) | (No Guidance) |
| Main | — | On the drive | On the drive | On the drive |

TABLE VII-continued

| Current Position | Drive Lane | | | |
|---|---|---|---|---|
| | Exit Way | Left | Center | Right |
| Road (Reliable) | | route. Wait next guidance. | route. Wait next guidance. | route. Wait next guidance. |

The first column of Table VII gives the current vehicle position which is detected by position sensor 10. While the vehicle is running within a 4-lane section where the exitway branches off, the vehicle position is determined by detection of the lane and/or line width increase in the manner described hereinbefore in detail. The last four vehicle positions in Table VII are the results of such determination accompanied by the reliability level, "Possible" (Level 3) or "Reliable" (Level 4). The current lane position is defined by the column heading in Table VII. While the vehicle is running along a 3-lane main road, voice guidance is given to the driver at positions of 2 km, 700 m and 300 m ahead of the beginning of the exitway. The voice guidance messages attract the driver's notice to the exit and induce the driver to keep the current lane.

In accordance with the present invention, branch determination and lane position determination provides better accuracy and reliability in "map matching" in the navigation system, for example.

Although the present invention has been described and illustrated in conjunction with specific embodiments thereof, it is to be understood that the present invention is not limited to these embodiments and involves various changes and modifications within the spirit and scope of the invention defined in the appended claims. In the foregoing description, the traffic rule is "keep to the left" as in Japan and Great Britain. It would be self-explanatory to a man skilled in the art that each embodiment may be put into practice with necessary minor changes where a different traffic rule is applicable.

What is claimed is:

1. A vehicle control system comprising:
   line recognizing means for recognizing indicator lines on a road;
   branch determination means for determining which branch the vehicle has taken at a junction in the road where the road divides into a plurality of branches, based on the status of indicator lines on the road recognized by the line recognizing means;
   drive position determining means for determining the vehicle position with respect to the indicator lines; and
   control means for controlling operation of at least one system in the vehicle depending upon the result of the determination by said drive position determination means and the determination made by said branch determination means.

2. A vehicle control system according to claim 1 wherein said line recognizing means includes camera means for taking a picture of the road ahead of the vehicle on which the vehicle is running.

3. A vehicle control system according to claim 1 wherein said drive position determination means comprises lane width change detecting means for detecting the distance between two of the indicator lines, said two indicator lines being located at opposite sides of a lane in which the vehicle is traveling, and said branch determination means determines the branch taken by the vehicle at the junction in the road in accordance with the distance detected by said lane width change detecting means.

4. A vehicle control system according to claim 1 wherein said drive position determination means comprises line width change detecting means for detecting the width of at least one of the indicator lines, said indicator line being located at one side of a lane on which the vehicle is running, and said branch determination means determines the branch taken by the vehicle at the junction in the road depending upon the width detected by said line width change detecting means.

5. A vehicle control system according to claim 1 wherein said drive position determination means comprises lane width change detecting means for detecting the distance between two of the indicator lines, said two indicator lines being located at opposite sides of a lane in which the vehicle is traveling, line width change detecting means for detecting the width of at least one of said two indicator lines, and wherein said branch determination means determines the branch taken by the vehicle at the junction in the road in accordance with the distance detected by said lane width change detecting means and the width detected by said line width change detection means.

6. A vehicle control system according to claim 1 wherein said drive position determination means comprises lane continuity detecting means for detecting continuity of at least one of the indicator lines, to determine if the one indicator line is solid or broken, said one indicator line being located at one of opposing sides of a lane in which the vehicle is traveling, and drive lane determination means for determining the lane of the road traveled by the vehicle in accordance with the determination of said lane continuity detecting means.

7. A vehicle control system according to claim 1 wherein said drive position determination means comprises line shift detecting means for detecting that one of the indicator lines has gradually moved from one side to the other, and lane change determination means for determining that the vehicle has changed lanes when a line shift is detected by said line shift detecting means.

8. A vehicle control system according to claim 1 which further comprises reliability determination means for determining a reliability level for the drive position determined by said drive position determination means, operation of said control means varying in accordance with the reliability level determined by said reliability determination means.

9. A vehicle control system according to claim 8 wherein said reliability determination means determines a reliability level in accordance with a plurality of determinations by said drive position determination means that have been obtained within a predetermined period of time.

10. A vehicle control system according to claim 1 wherein said reliability determination means determines a reliability level in accordance with a first vehicle position determined by said drive position determination means and a second vehicle position determined by said drive position determination means within a predetermined period of time after determination of the first vehicle position.

11. A vehicle control system according to claim 1 wherein said control means utilizes road data for a first drive route inferred from the current position detected by said current position sensor means, and utilizes road data for a second drive route when a second drive route that is different from said first drive route is indicated by the determination of said drive position determination means.

12. A vehicle control system according to claim 8 which further comprises decelerating operation sensor means for detecting initiation of a decelerating operation, the reliability level determined by said reliability level determination means being based at least in part on detection of some decelerating operation by said decelerating operation sensor means.

13. A vehicle control system according to claim 1 which further comprises decelerating operation sensor means for detecting initiation of a decelerating operation, said control means being made operative in response to detection of some decelerating operation by said decelerating operation sensor means.

14. A vehicle control system according to claim 13 wherein said decelerating operation is at least one selected from the group consisting of operation of a foot brake pedal, release of an accelerator pedal, operation of a trafficator and rotation of a steering beyond a predetermined angle.

15. A vehicle control system according to claim 1 further comprising:

current position sensor means for detecting a current position of a vehicle;

memory means for storing road information or data;

wherein said control means controls operation of said one system in accordance with the road information stored in said memory means, based on the vehicle current position detected by said current position sensor means.

16. A vehicle control system according to claim 1 wherein said control means controls a shiftable range of speeds or gear ratios in an automatic transmission.

17. A vehicle control system according to claim 15 further comprising:

navigation means for guiding the driver along a drive route to a predetermined goal based on the current vehicle position detected by said current position sensor means, the road information stored in said memory means and navigation information determined by said control means based on the road data and the vehicle position determined by said drive position determination means.

18. A vehicle control system according to claim 17 further comprising:

reliability determination means for determining a reliability level for the drive position that has been determined by said drive position determination means, said control means including correction means for changing content of the navigation information in accordance with said reliability level.

19. A process of vehicle control comprising the steps of:

taking a picture of a road ahead of a current vehicle position including indicator lines extending on the road;

determining a current vehicle position with respect to the indicator lines;

obtaining road data for a drive route to be determined extending from the current vehicle position; and controlling operation of at least one system in the vehicle in accordance with the road data, said determining of the current vehicle position being based on at least one of:

drive lane determination that identifies a currently driven lane from among plural lanes of a multi-lane road by detection of the indicator lines as solid or broken;

branch determination that determines if the vehicle has entered a junction on the road based upon detection of change of profile of the indicator lines; and lane change determination that determines a lane change by the vehicle at the junction based upon detection of lateral movement of the indicator lines in the picture.

20. A computer readable memory media to be used in combination with a computer mounted on a vehicle, said memory media storing a program by which the computer operates vehicle control in accordance with a specific process comprising the steps of:

taking a picture of a road ahead of a current vehicle position including indicator lines extending on the road;

determining a current vehicle position with respect to the indicator lines;

obtaining road data for a drive route from the current vehicle position; and controlling operation of at least one system on the vehicle depending upon the road data; said determining of the current vehicle position being based on at least of:

drive lane determination that identifies a currently driven lane from among plural lanes of a multi-lane road by detection of the indicator line as solid or broken;

branch determination that determines if the vehicle has entered a junction on the road based upon detection of change of profile of the indicator lines; and lane change determination that determines a lane change by the vehicle at the junction based upon detection of lateral movement of the indicator lines in the picture.

21. A vehicle control system according to claim 15 wherein said decelerating operation is at least one selected from the group consisting of operation of a foot brake pedal, release of an accelerator pedal, operation of a trafficator and rotation of a steering element through a predetermined angle.

* * * * *

UNITED STATES PATENT AND TRADEMARK OFFICE
CERTIFICATE OF CORRECTION

PATENT NO. : 6,577,334 B1
DATED : June 10, 2003
INVENTOR(S) : Kawai et al.

It is certified that error appears in the above-identified patent and that said Letters Patent is hereby corrected as shown below:

Column 6,
Line 16, "Ni" should read -- N1 --.

Column 14,
Line 52, "5110" should read -- S110 --.

Column 21,
Line 38, "5701" should read -- S701 --.

Column 25,
Line 25, "LI-Ln" should read -- L1-Ln --.

Column 28,
Line 63, "53074" should read -- S3074 --.

Column 30,
Line 59, "Ri" should read -- R1 --.

Column 31,
Lines 48 and 50, "(4W5)" should read -- (4WD) --

Column 33,
Line 51, after "lines" insert
-- , said drive position determination means comprising line width change detecting means for detecting the width of at least one of the indicator lines, said at least one indicator line being located at one side of a lane on which the vehicle is running, and said branch determination means determines the branch taken by the vehicle at the junction in the road depending upon the width detected by said line width change detecting means--.

Column 34,
Line 2, after "means" insert -- and the width detected by said line width change detection means --.
Line 52, "claim 1" should read -- claim 8 --.

UNITED STATES PATENT AND TRADEMARK OFFICE
CERTIFICATE OF CORRECTION

PATENT NO.   : 6,577,334 B1
DATED        : June 10, 2003
INVENTOR(S)  : Kawai et al.

It is certified that error appears in the above-identified patent and that said Letters Patent is hereby corrected as shown below:

Column 35,
Line 16, after "steering" insert -- element --.

Column 36,
Lines 14 and 41, "profile" should read -- width --;
Line 34, delete "at least of:";
Delete lines 35-38, i.e., "drive lane determination… broken;";
Line 46, "claim 15" should read -- claim 13 --.

Signed and Sealed this

Thirty-first Day of August, 2004

JON W. DUDAS
*Director of the United States Patent and Trademark Office*